US012058501B2

(12) United States Patent
Fuchs et al.

(10) Patent No.: US 12,058,501 B2
(45) Date of Patent: *Aug. 6, 2024

(54) APPARATUS, METHOD AND COMPUTER PROGRAM FOR ENCODING, DECODING, SCENE PROCESSING AND OTHER PROCEDURES RELATED TO DirAC BASED SPATIAL AUDIO CODING

(71) Applicant: Fraunhofer-Gesellschaft zur Förderung der angewandten Forschung e.V., Munich (DE)

(72) Inventors: Guillaume Fuchs, Bubenreuth (DE); Jürgen Herre, Erlangen (DE); Fabian Küch, Erlangen (DE); Stefan Döhla, Erlangen (DE); Markus Multrus, Nuremberg (DE); Oliver Thiergart, Erlangen (DE); Oliver Wübbolt, Hannover (DE); Florin Ghido, Nuremberg (DE); Stefan Bayer, Nuremberg (DE); Wolfgang Jaegers, Forchheim (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,169

(22) Filed: Jan. 26, 2022

(65) Prior Publication Data

US 2022/0150635 A1 May 12, 2022

Related U.S. Application Data

(60) Division of application No. 16/821,069, filed on Mar. 17, 2020, now Pat. No. 11,368,790, which is a
(Continued)

(30) Foreign Application Priority Data

Oct. 4, 2017 (EP) .................................... 17194816

(51) Int. Cl.
*G06F 17/00* (2019.01)
*H04R 5/04* (2006.01)
*H04S 7/00* (2006.01)

(52) U.S. Cl.
CPC ................ *H04R 5/04* (2013.01); *H04S 7/30* (2013.01); *H04S 7/40* (2013.01); *H04R 2205/024* (2013.01)

(58) Field of Classification Search
CPC ....... H04R 5/04; H04R 2205/024; H04S 7/30; H04S 7/40
(Continued)

(56) References Cited

U.S. PATENT DOCUMENTS

| | | | |
|---|---|---|---|
| 6,460,016 | B1 | 10/2002 | Sueyoshi et al. |
| 9,015,051 | B2 | 4/2015 | Pulkki |

(Continued)

FOREIGN PATENT DOCUMENTS

| | | | |
|---|---|---|---|
| CN | 102422348 | A | 4/2012 |
| CN | 103236255 | A | 8/2013 |

(Continued)

OTHER PUBLICATIONS

V. Pulkki et al.: "Directional audio coding—perception-based reproduction of spatial sound", International Workshop on the Principles and Application on Spatial Hearing, Nov. 2009, Zao; Miyagi, Japan.
(Continued)

*Primary Examiner* — Paul C McCord
(74) *Attorney, Agent, or Firm* — McClure, Qualey & Rodack, LLP

(57) ABSTRACT

An apparatus for generating a description of a combined audio scene, includes: an input interface for receiving a first
(Continued)

description of a first scene in a first format and a second description of a second scene in a second format, wherein the second format is different from the first format; a format converter for converting the first description into a common format and for converting the second description into the common format, when the second format is different from the common format; and a format combiner for combining the first description in the common format and the second description in the common format to obtain the combined audio scene.

17 Claims, 31 Drawing Sheets

Related U.S. Application Data continuation of application No. PCT/EP2018/076641, filed on Oct. 1, 2018.

(58) Field of Classification Search
USPC ........................................................ 700/94
See application file for complete search history.

(56) References Cited

U.S. PATENT DOCUMENTS

| | | | | |
|---|---|---|---|---|
| 2003/0218696 | A1 | 11/2003 | Bagga et al. | |
| 2007/0253440 | A1 | 11/2007 | Huang | |
| 2008/0004729 | A1* | 1/2008 | Hiipakka | H04R 5/04 381/17 |
| 2008/0232616 | A1 | 9/2008 | Pulkki et al. | |
| 2008/0232617 | A1 | 9/2008 | Goodwin et al. | |
| 2010/0169103 | A1 | 7/2010 | Pulkki | |
| 2011/0002469 | A1 | 1/2011 | Ojala | |
| 2011/0029113 | A1 | 2/2011 | Ishikawa et al. | |
| 2011/0216908 | A1 | 9/2011 | Galdo et al. | |
| 2011/0222694 | A1 | 9/2011 | Del Galdo et al. | |
| 2012/0057710 | A1 | 3/2012 | Disch et al. | |
| 2012/0114126 | A1 | 5/2012 | Thiergart et al. | |
| 2013/0003998 | A1 | 1/2013 | Kirkeby et al. | |
| 2013/0114819 | A1 | 5/2013 | Melchior et al. | |
| 2013/0142341 | A1 | 6/2013 | Del Galdo et al. | |
| 2013/0230187 | A1 | 9/2013 | Kuech et al. | |
| 2013/0272526 | A1 | 10/2013 | Walther | |
| 2014/0016786 | A1 | 1/2014 | Sen | |
| 2015/0098571 | A1* | 4/2015 | Jarvinen | H04S 7/302 381/1 |
| 2016/0064005 | A1 | 3/2016 | Peters et al. | |
| 2016/0119734 | A1 | 4/2016 | Sladeczek et al. | |
| 2016/0131592 | A1 | 5/2016 | Cooper | |
| 2016/0227337 | A1 | 8/2016 | Goodwin et al. | |

FOREIGN PATENT DOCUMENTS

| | | | |
|---|---|---|---|
| CN | 104428834 | A | 3/2015 |
| CN | 104768053 | A | 7/2015 |
| JP | 2012-526296 | A | 10/2012 |
| JP | 2015-502573 | A | 1/2015 |
| JP | 2015-522183 | A | 8/2015 |
| JP | 2016-072973 | A | 5/2016 |
| RU | 2504918 | C2 | 8/2012 |
| TW | 200742359 | A | 11/2007 |
| TW | I556654 | B | 7/2012 |
| TW | I524786 | B | 8/2012 |
| WO | 2009/056956 | A1 | 5/2009 |
| WO | 2010/128136 | A1 | 11/2010 |
| WO | 2014/014757 | A1 | 1/2014 |

OTHER PUBLICATIONS

Ville Pulkki: "Virtual sound source positioning using vector base amplitude panning". J. Audio Eng. Soc., 45(6): pp. 456-466, Jun. 1997.

M. V. Laitinen et al.: "Converting 5.1 audio recordings to B-format for directional audio coding reproduction," 2011 IEEE International Conference on Acoustics, Speech and Signal Processing (ICASSP), Prague, 2011, pp. 61-64.

G. Del Galdo et al.: "Efficient merging of multiple audio streams for spatial sound reproduction in Directional Audio Coding," 2009 IEEE International Conference on Acoustics, Speech and Signal Processing, Taipei, 2009, pp. 265-268.

R. Schultz-Amling et al.: "Planar Microphone Array Processing for the Analysis and Reproduction of Spatial Audio using Directional Audio Coding," Audio Engineering Society Convention 124, Amsterdam, The Netherlands, 2008.

Daniel P. Jarrett et al.: "Coherence-Based Diffuseness Estimation in the Spherical Harmonic Domain", IEEE 27th Convention of Electrical and Electronics Engineers in Israel (IEEEI), 2012, pp. 1-5.

G. Del Galdo et al.: "Efficient Methods for High Quality Merging of Spatial Audio Streams in Directional Audio Coding"; AES Convention 126; May 2009, AES, 60 East 42nd Street, Room 2520 New York 10165-2520, USA, May 1, 2009 (May 1, 2009), XP040509015.

V. Pulkki et al.: "Efficient Spatial Sound Synthesis for Virtual Worlds"; Conference: 35th International Conference: Audio for Games; Feb. 2009, AES, 60 East 42nd Street, Room 2520 New York 10165-2520, USA, Feb. 1, 2009 (Feb. 1, 2009), XP040509261, pp. 1-10.

Jürgen Herre et al.: "Interactive Teleconferencing Combining Spatial Audio Object Coding and DirAC Technology", Audio Engineering Society Convention P, New York, NY, US, May 22, 2010 (May 22, 2010), pp. 1-12, XP007913469.

Laitinen: "Converting Two-Channel Stereo Signals to B-Format for Directional Audio Coding Reproduction", AES Convention 137; Oct. 2014, AES, 60 East 42nd Street, Room 2520 New York 10165-2520, USA, Oct. 8, 2014 (Oct. 8, 2014), XP040639036.

Anonymous: "Thoughts on 3D Audio", 98. MPEG Meeting; Nov. 28, 2011-Feb. 12, 2012; Geneva; (Motion Picture Expert Group or ISO/IEC JTC1/SC29/WG11), No. NI2412, Dec. 3, 2011 (Dec. 3, 2011), XP030018902.

Archontis Politis et al.: "Parametric Spatial Audio Effects", Proc. of the 15 th Int, Sep. 17, 2012 (Sep. 17, 2012), XP055527425, York, UK Retrieved from the Internet: URL:https://www.dafx12.york.ac.uk/papers/dafx12submission 22.pdf [retrTeved on Nov. 27, 2018], pp. 1-8.

Markus Kallinger et al.: "A Spatial Filtering Approach for Directional Audio Coding", AES Convention 126; May 2009, AES, 60 East 42nd Street, Room 2520 New York 10165-2520, USA, May 1, 2009 (May 1, 2009), XP040508935.

Markus Kallinger et al.: "Spatial filtering using directional audio coding parameters", Acoustics, Speech and Signal Processing, 2009. ICASSP 2009. IEEE International Conference on, IEEE, Piscataway, NJ, USA, Apr. 19, 2009 (Apr. 19, 2009), XP031459205, pp. 217-220.

R. Schultz-Amling et al.: "Acoustical Zooming Based on a Parametric Sound Field Representation", AES Convention 128; May 2010, AES, 60 East 42nd Street, Room 2520 New York 10165-2520, USA, May 1, 2010 (May 1, 2010), XP040509503.

Search Report, Apr. 11, 2019 from PCT/EP2018/076641.

English Translation of Official Letter and Search Report, Apr. 11, 2019.

Written Opinion, Apr. 11, 2019 from PCT/EP2018/076641.

Taiwan Office Action dated Aug. 28, 2020, issued in application No. 108141539.

English Translation of Taiwan Office Action dated Aug. 28, 2020, issued in application No. 108141539.

P. Motlicek et al. "Real-Time Audio-Visual Analysis for Multiperson Videoconferencing", published in 2013 on 22 pages, on the internet at URL:https://www.hindawi.com/journals/am/2013/175745/, "3.3. Spatial Audio Object Coding").

Russian Office Action dated Oct. 14, 2020, in patent application No. 2020115048, with English translation.

Singapore Office Action, dated Apr. 13, 2021, in the parallel patent application No. 11202003125S.

Japanese language office action dated Aug. 10, 2021, issued in application No. JP 2020-519284.

(56) References Cited

OTHER PUBLICATIONS

English language translation of Japanese office action dated Aug. 10, 2021, issued in application No. JP 2020-519284. .
Chinese language office action dated Dec. 19, 2022, issued in application No. CN 201880077928.6.
English language translation of office action dated Dec. 19, 2022, issued in application No. CN 201880077928.6 (pp. 1-7 of attachment).
Non-Final Office Action issued in U.S. Appl. No. 17/585,124, dated Nov. 28, 2022, filed Jan. 26, 2022 (copy hot provided).
Fug_Design_coding_processing_for _ Objectbased_interactive_audio_c2014 (Year: 2014) (copy not provided).
Office Action dated Apr. 4, 2024, issued in application No. MY PI2020001716.

* cited by examiner

- block diagram for combining different audio scenes in different formats in the pressure/velocity domain

- block diagram for combining
≠ audio scenes in different formats in the
DirAC parameter domain combiner could be:

alt. ①

$$\Psi = \frac{1}{\sum E^i} \sum_{i=1}^{N} E^i \Psi^i$$

$$e_{DoA} = \frac{1}{\sum (1-\Psi^i E^i)} \sum_{i=1}^{N} (1-\Psi^i E^i) E^i e^i_{DoA}$$

alt. ②

$\Psi = 0$ (since audio objects have no diffuseness usually)

$$e_{DoA} = e_{DoA}^{\mathrm{argmax}(E^i)}$$

- block diagram for deriving DirAC parameters from an audio object

DirAC synthesizer

DirAC synthesizer $$\vec{R} + \overrightarrow{DoA} = \vec{P}$$

$$\overrightarrow{DoA} = \vec{P} - \vec{R}$$

$$\overrightarrow{doa} = \frac{\vec{P} - \vec{R}}{|\overrightarrow{DoA}|}$$

DirAC analysis

DirAC synthesis

APPARATUS, METHOD AND COMPUTER PROGRAM FOR ENCODING, DECODING, SCENE PROCESSING AND OTHER PROCEDURES RELATED TO DirAC BASED SPATIAL AUDIO CODING

CROSS-REFERENCE TO RELATED APPLICATIONS

This application is a divisional of copending U.S. application Ser. No. 16/821,069, filed Mar. 17, 2020, which is incorporated herein by reference in its entirety, which in turn is a continuation of copending International Application No. PCT/EP2018/076641, filed Oct. 1, 2018, which is incorporated herein by reference in its entirety, and additionally claims priority from European Application No. EP 17194816.9, filed Oct. 4, 2017, which is incorporated herein by reference in its entirety.

The present invention is related to audio signal processing and particularly to audio signal processing of audio descriptions of audio scenes.

BACKGROUND OF THE INVENTION

Transmitting an audio scene in three dimensions may involve handling multiple channels which usually engenders a large amount of data to transmit. Moreover 3D sound can be represented in different ways: traditional channel-based sound where each transmission channel is associated with a loudspeaker position; sound carried through audio objects, which may be positioned in three dimensions independently of loudspeaker positions; and scene-based (or Ambisonics), where the audio scene is represented by a set of coefficient signals that are the linear weights of spatially orthogonal basis functions, e.g., spherical harmonics. In contrast to channel-based representation, scene-based representation is independent of a specific loudspeaker set-up, and can be reproduced on any loudspeaker set-ups at the expense of an extra rendering process at the decoder.

For each of these formats, dedicated coding schemes were developed for efficiently storing or transmitting at low bit-rates the audio signals. For example, MPEG surround is a parametric coding scheme for channel-based surround sound, while MPEG Spatial Audio Object Coding (SAOC) is a parametric coding method dedicated to object-based audio. A parametric coding technique for high order of Ambisonics was also provided in the recent standard MPEG-H phase 2.

In this context, where all three representations of the audio scene, channel-based, object-based and scene-based audio, are used and need to be supported, there is a need to design a universal scheme allowing an efficient parametric coding of all three 3D audio representations. Moreover there is a need to be able to encode, transmit and reproduce complex audio scenes composed of a mixture of the different audio representations.

Directional Audio Coding (DirAC) technique [1] is an efficient approach to the analysis and reproduction of spatial sound. DirAC uses a perceptually motivated representation of the sound field based on direction of arrival (DOA) and diffuseness measured per frequency band. It is built upon the assumption that at one time instant and at one critical band, the spatial resolution of auditory system is limited to decoding one cue for direction and another for inter-aural coherence. The spatial sound is then represented in frequency domain by cross-fading two streams: a non-directional diffuse stream and a directional non-diffuse stream.

DirAC was originally intended for recorded B-format sound but could also serve as a common format for mixing different audio formats. DirAC was already extended for processing the conventional surround sound format 5.1 in [3]. It was also proposed to merge multiple DirAC streams in [4]. Moreover, DirAC we extended to also support microphone inputs other than B-format [6].

However, a universal concept is missing to make DirAC a universal representation of audio scenes in 3D which also is able to support the notion of audio objects.

Few considerations were previously done for handling audio objects in DirAC. DirAC was employed in [5] as an acoustic front end for the Spatial Audio Coder, SAOC, as a blind source separation for extracting several talkers from a mixture of sources. It was, however, not envisioned to use DirAC itself as the spatial audio coding scheme and to process directly audio objects along with their metadata and to potentially combine them together and with other audio representations.

SUMMARY

According to an embodiment, an apparatus for generating a description of a combined audio scene may have: an input interface for receiving a first description of a first scene in a first format and a second description of a second scene in a second format, wherein the second format is different from the first format; a format converter for converting the first description into a common format and for converting the second description into the common format, when the second format is different from the common format; and a format combiner for combining the first description in the common format and the second description in the common format to acquire the description of the combined audio scene.

According to another embodiment, a method for generating a description of a combined audio scene may have the steps of: receiving a first description of a first scene in a first format and receiving a second description of a second scene in a second format, wherein the second format is different from the first format; converting the first description into a common format and converting the second description into the common format, when the second format is different from the common format; and combining the first description in the common format and the second description in the common format to acquire the description of the combined audio scene.

Another embodiment may have a non-transitory digital storage medium having a computer program stored thereon to perform, when said computer program is run by a computer, the method for generating a description of a combined audio scene having the steps of: receiving a first description of a first scene in a first format and receiving a second description of a second scene in a second format, wherein the second format is different from the first format; converting the first description into a common format and converting the second description into the common format, when the second format is different from the common format; and combining the first description in the common format and the second description in the common format to acquire the description of the combined audio scene.

Embodiments of the invention relate to a universal parametric coding scheme for 3D audio scene built around the Directional Audio Coding paradigm (DirAC), a perceptually-motivated technique for spatial audio processing. Originally DirAC was designed to analyze a B-format recording of the audio scene. The present invention aims to extend its ability to process efficiently any spatial audio formats such as channel-based audio, Ambisonics, audio objects, or a mix of them DirAC reproduction can easily be generated for arbitrary loudspeaker layouts and headphones. The present invention also extends this ability to output additionally Ambisonics, audio objects or a mix of a format. More importantly the invention enables the possibility for the user to manipulate audio objects and to achieve, for example, dialogue enhancement at the decoder end.

Context: System Overview of a DirAC Spatial Audio Coder

In the following, an overview of a novel spatial audio coding system based on DirAC designed for Immersive Voice and Audio Services (IVAS) is presented. The objective of such a system is to be able to handle different spatial audio formats representing the audio scene and to code them at low bit-rates and to reproduce the original audio scene as faithfully as possible after transmission.

The system can accept as input different representations of audio scenes. The input audio scene can be captured by multi-channel signals aimed to be reproduced at the different loudspeaker positions, auditory objects along with metadata describing the positions of the objects over time, or a first-order or higher-order Ambisonics format representing the sound field at the listener or reference position.

Advantageously; the system is based on 3GPP Enhanced Voice Services (EVS) since the solution is expected to operate with low latency to enable conversational services on mobile networks.

FIG. 9 is the encoder side of the DirAC-based spatial audio coding supporting different audio formats. As shown in FIG. 9, the encoder (IVAS encoder) is capable of supporting different audio formats presented to the system separately or at the same time. Audio signals can be acoustic in nature, picked up by microphones, or electrical in nature, which are supposed to be transmitted to the loudspeakers. Supported audio formats can be multi-channel signal, first-order and higher-order Ambisonics components, and audio objects. A complex audio scene can also be described by combining different input formats. All audio formats are then transmitted to the DirAC analysis 180, which extracts a parametric representation of the complete audio scene. A direction of arrival and a diffuseness measured per time-frequency unit form the parameters. The DirAC analysis is followed by a spatial metadata encoder 190, which quantizes and encodes DirAC parameters to obtain a low bit-rate parametric representation.

Along with the parameters, a down-mix signal derived 160 from the different sources or audio input signals is coded for transmission by a conventional audio core-coder 170. In this case an EVS-based audio coder is adopted for coding the down-mix signal. The down-mix signal consists of different channels, called transport channels: the signal can be e.g. the four coefficient signals composing a B-format signal, a stereo pair or a monophonic down-mix depending of the targeted bit-rate. The coded spatial parameters and the coded audio bitstream are multiplexed before being transmitted over the communication channel.

FIG. 10 is a decoder of the DirAC-based spatial audio coding delivering different audio formats. In the decoder, shown in FIG. 10, the transport channels are decoded by the core-decoder 1020, while the DirAC metadata is first decoded 1060 before being conveyed with the decoded transport channels to the DirAC synthesis 220, 240. At this stage (1040), different options can be considered. It can be requested to play the audio scene directly on any loudspeaker or headphone configurations as is usually possible in a conventional DirAC system (MC in FIG. 10). In addition, it can also be requested to render the scene to Ambisonics format for other further manipulations, such as rotation, reflection or movement of the scene (FOA/HOA in FIG. 10). Finally, the decoder can deliver the individual objects as they were presented at the encoder side (Objects in FIG. 10).

Audio objects could also be restituted but it is more interesting for the listener to adjust the rendered mix by interactive manipulation of the objects. Typical object manipulations are adjustment of level, equalization or spatial location of the object.

Object-based dialogue enhancement becomes, for example, a possibility given by this interactivity feature. Finally, it is possible to output the original formats as they were presented at the encoder input. In this case, it could be a mix of audio channels and objects or Ambisonics and objects. In order to achieve separate transmission of multi-channels and Ambisonics components, several instances of the described system could be used.

The present invention is advantageous in that, particularly in accordance with the first aspect, a framework is established in order to combine different scene descriptions into a combined audio scene by way of a common format, that allows to combine the different audio scene descriptions.

This common format may, for example, be the B-format or may be the pressure/velocity signal representation format, or can, advantageously, also be the DirAC parameter representation format.

This format is a compact format that, additionally, allows a significant amount of user interaction on the one hand and that is, on the other hand, useful with respect to a useful bitrate for representing an audio signal.

In accordance with a further aspect of the present invention, a synthesis of a plurality of audio scenes can be advantageously performed by combing two or more different DirAC descriptions. Both these different DirAC descriptions can be processed by combining the scenes in the parameter domain or, alternatively, by separately rendering each audio scene and by then combining the audio scenes that have been rendered from the individual DirAC descriptions in the spectral domain or, alternatively, already in the time domain.

This procedure allows for a very efficient and nevertheless high quality processing of different audio scenes that are to be combined into a single scene representation and, particularly, a single time domain audio signal.

A further aspect of the invention is advantageous in that a particularly useful audio data converted for converting object metadata into DirAC metadata is derived where this audio data converter can be used in the framework of the first, the second or the third aspect or can also be applied independent from each other. The audio data converter allows efficiently converting audio object data, for example, a waveform signal for an audio object, and corresponding position data, typically, with respect to time for representing a certain trajectory of an audio object within a reproduction setting up into a very useful and compact audio scene description, and, particularly, the DirAC audio scene description format. While a typical audio object description with an audio object waveform signal and an audio object position metadata is related to a particular reproduction setup or, generally, is related to a certain reproduction coordinate system, the DirAC description is particularly useful in that it is related to a listener or microphone position and is completely free of any limitations with respect to a loudspeaker setup or a reproduction setup.

Thus, the DirAC description generated from audio object metadata signals additionally allows for a very useful and compact and high quality combination of audio objects different from other audio object combination technologies such as spatial audio object coding or amplitude panning of objects in a reproduction setup.

An audio scene encoder in accordance with a further aspect of the present invention is particularly useful in providing a combined representation of an audio scene having DirAC metadata and, additionally, an audio object with audio object metadata.

Particularly, in this situation, it is particularly useful and advantageous for a high interactivity in order to generate a combined metadata description that has DirAC metadata on the one hand and, in parallel, object metadata on the other hand. Thus, in this aspect, the object metadata is not combined with the DirAC metadata, but is converted into DirAC-like metadata so that the object metadata comprises at direction or, additionally, a distance and/or a diffuseness of the individual object together with the object signal. Thus, the object signal is converted into a DirAC-like representation so that a very flexible handling of a DirAC representation for a first audio scene and an additional object within this first audio scene is allowed and made possible. Thus, for example, specific objects can be very selectively processed due to the fact that their corresponding transport channel on the one hand and DirAC-style parameters on the other hand are still available.

In accordance with a further aspect of the invention, an apparatus or method for performing a synthesis of audio data are particularly useful in that a manipulator is provided for manipulating a DirAC description of one or more audio objects, a DirAC description of the multichannel signal or a DirAC description of first order Ambisonics signals or higher Ambisonics signals. And, the manipulated DirAC description is then synthesized using a DirAC synthesizer.

This aspect has the particular advantage that any specific manipulations with respect to any audio signals are very usefully and efficiently performed in the DirAC domain, i.e., by manipulating either the transport channel of the DirAC description or by alternatively manipulating the parametric data of the DirAC description. This modification is substantially more efficient and more practical to perform in the DirAC domain compared to the manipulation in other domains. Particularly, position-dependent weighting operations as advantageous manipulation operations can be particularly performed in the DirAC domain. Thus, in a specific embodiment, a conversion of a corresponding signal representation in the DirAC domain and, then, performing the manipulation within the DirAC domain is a particularly useful application scenario for modern audio scene processing and manipulation.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
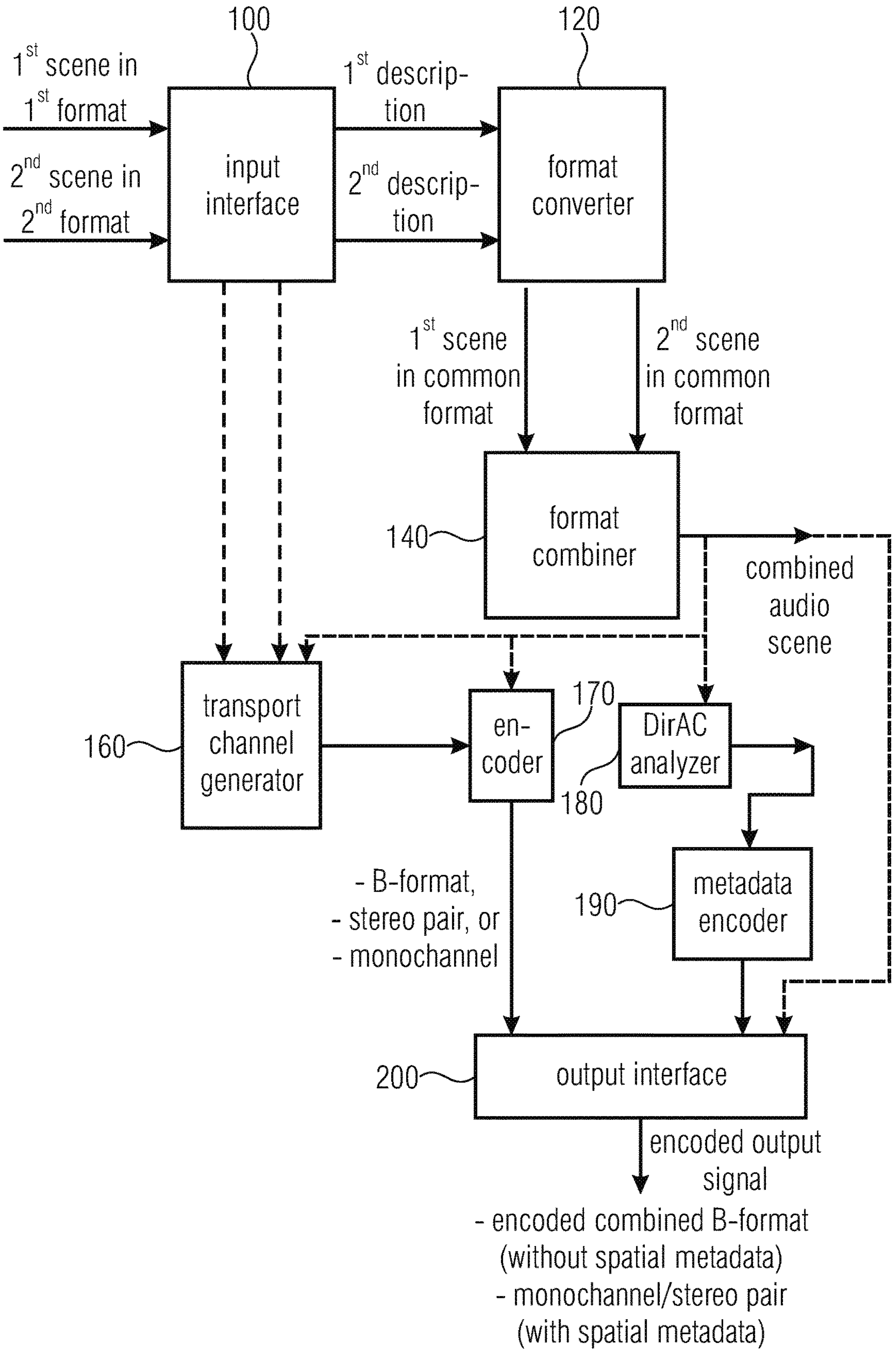
FIG. 1*a* is a block diagram of an implementation of an apparatus or method for generating a description of a combined audio scene in accordance with a first aspect of the invention.

FIG. 1*a* illustrates an embodiment of an apparatus for generating a description of a combined audio scene. The apparatus comprises an input interface 100 for receiving a first description of a first scene in a first format and a second description of a second scene in a second format, wherein the second format is different from the first format. The format can be any audio scene format such as any of the formats or scene descriptions illustrated from FIGS. 16*a* to 16*f*.

Figures 16A, 16B, 16C:
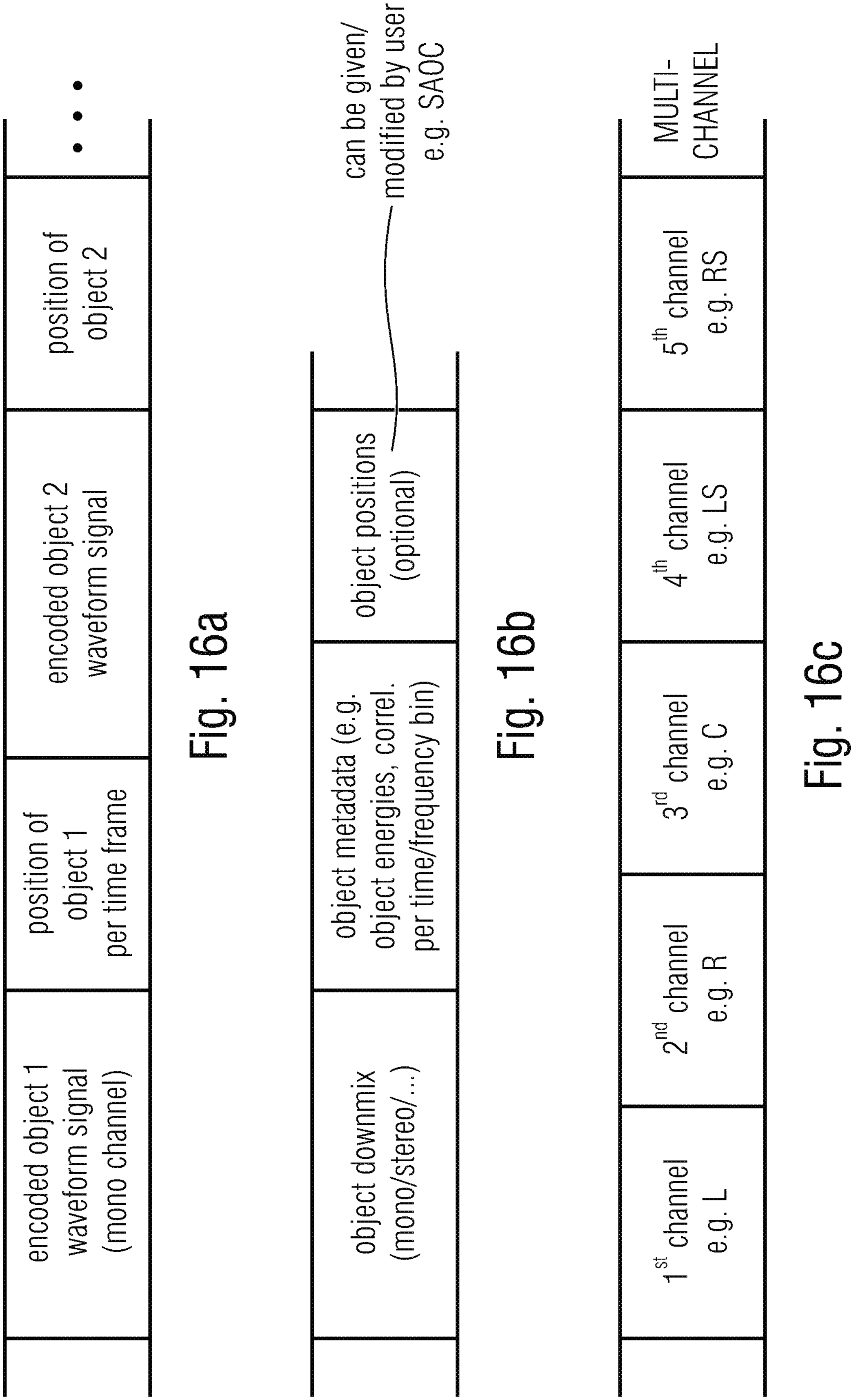
FIG. 16*a-f* illustrates several representations of useful audio formats in the context of the first to fifth aspects of the present invention.

FIG. 16*a*, for example, illustrates an object description consisting, typically, of a (encoded) object 1 waveform signal such as a mono-channel and corresponding metadata related to the position of object 1, where this is information is typically given for each time frame or a group of time frames, and which the object 1 waveforms signal is encoded. Corresponding representations for a second or further object can be included as illustrated in FIG. 16*a*.

Another alternative can be an object description consisting of an object downmix being a mono-signal, a stereo-signal with two channels or a signal with three or more channels and related object metadata such as object energies, correlation information per time/frequency bin and, optionally, the object positions. However, the object positions can also be given at the decoder side as typical rendering information and, therefore, can be modified by a user. The format in FIG. 16*b* can, for example, be implemented as the well-known SAOC (spatial audio object coding) format.

Another description of a scene is illustrated in FIG. 16*c* as a multichannel description having an encoded or non-encoded representation of a first channel, a second channel, a third channel, a fourth channel, or a fifth channel, where the first channel can be the left channel L, the second channel can be the right channel R, the third channel can be the center channel C, the fourth channel can be the left surround channel LS and the fifth channel can be the right surround channel RS. Naturally, the multi-channel signal can have a smaller or higher number of channels such as only two channels for a stereo channel or six channels for a 5.1 format or eight channels for a 7.1 format, etc.

Figure 16D:

A more efficient representation of a multichannel signal is illustrated in FIG. 16*d*, where the channel downmix such as a mono downmix, or stereo downmix or a downmix with more than two channels is associated with parametric side information as channel metadata for, typically, each time and/or frequency bin. Such a parametric representation can, for example, be implemented in accordance with the MPEG surround standard.

Figure 16E:
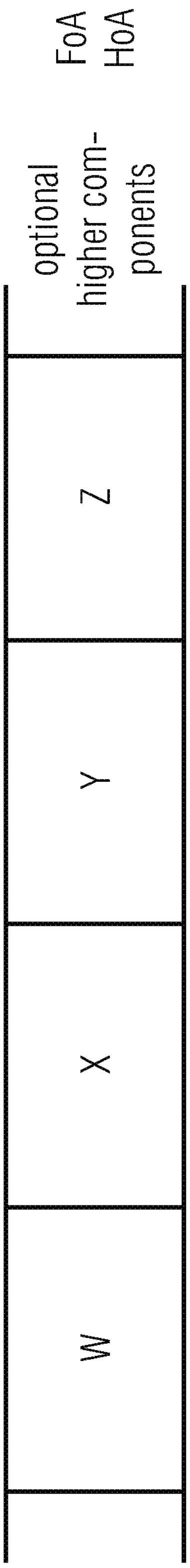

Another representation of an audio scene can, for example, be the B-format consisting of an omnidirectional signal W, and directional components X, Y, Z as shown in FIG. 16*e*. This would be a first order or FoA signal. A higher order Ambisonics signal, i.e., an HoA signal can have additional components as is known in the art.

The FIG. 16*e* representation is, in contrast to the FIG. 16*c* and FIG. 16*d* representation a representation that is non-dependent on a certain loudspeaker set up, but describes a sound field as experienced at a certain (microphone or listener) position.

Figure 16F:
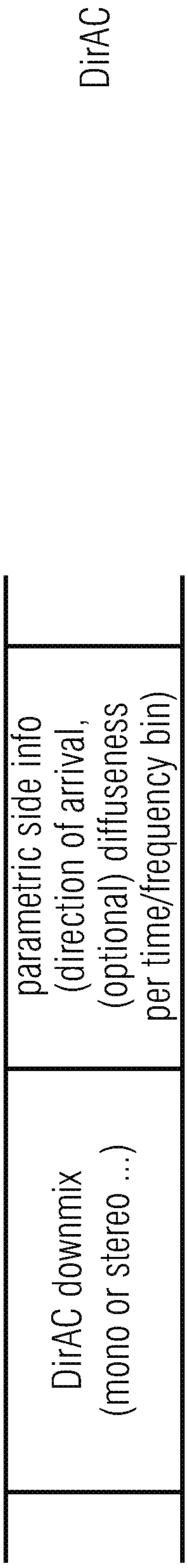

Another such sound field description is the DirAC format as, for example, illustrated in FIG. 16*f*. The DirAC format typically comprises a DirAC downmix signal which is a mono or stereo or whatever downmix signal or transport signal and corresponding parametric side information. This parametric side information is, for example, a direction of arrival information per time/frequency bin and, optionally, diffuseness information per time/frequency bin.

The input into the input interface 100 of FIG. 1*a* can be, for example, in any one of those formats illustrated with respect to FIG. 16*a* to FIG. 16*f*. The input interface 100 forwards the corresponding format descriptions to a format converter 120. The format converter 120 is configured for converting the first description into a common format and for converting the second description into the same common format, when the second format is different from the common format. When, however, the second format is already in the common format, then the format converter only convers the first description into the common format, since the first description is in a format different from the common format.

Thus, at the output of the format converter or, generally, at the input of a format combiner, there does exist a representation of the first scene in the common format and the representation of the second scene in the same common format. Due to the fact that both descriptions are now included in one and the same common format, the format combiner can now combine the first description and the second description to obtain a combined audio scene.

Figure 1B:
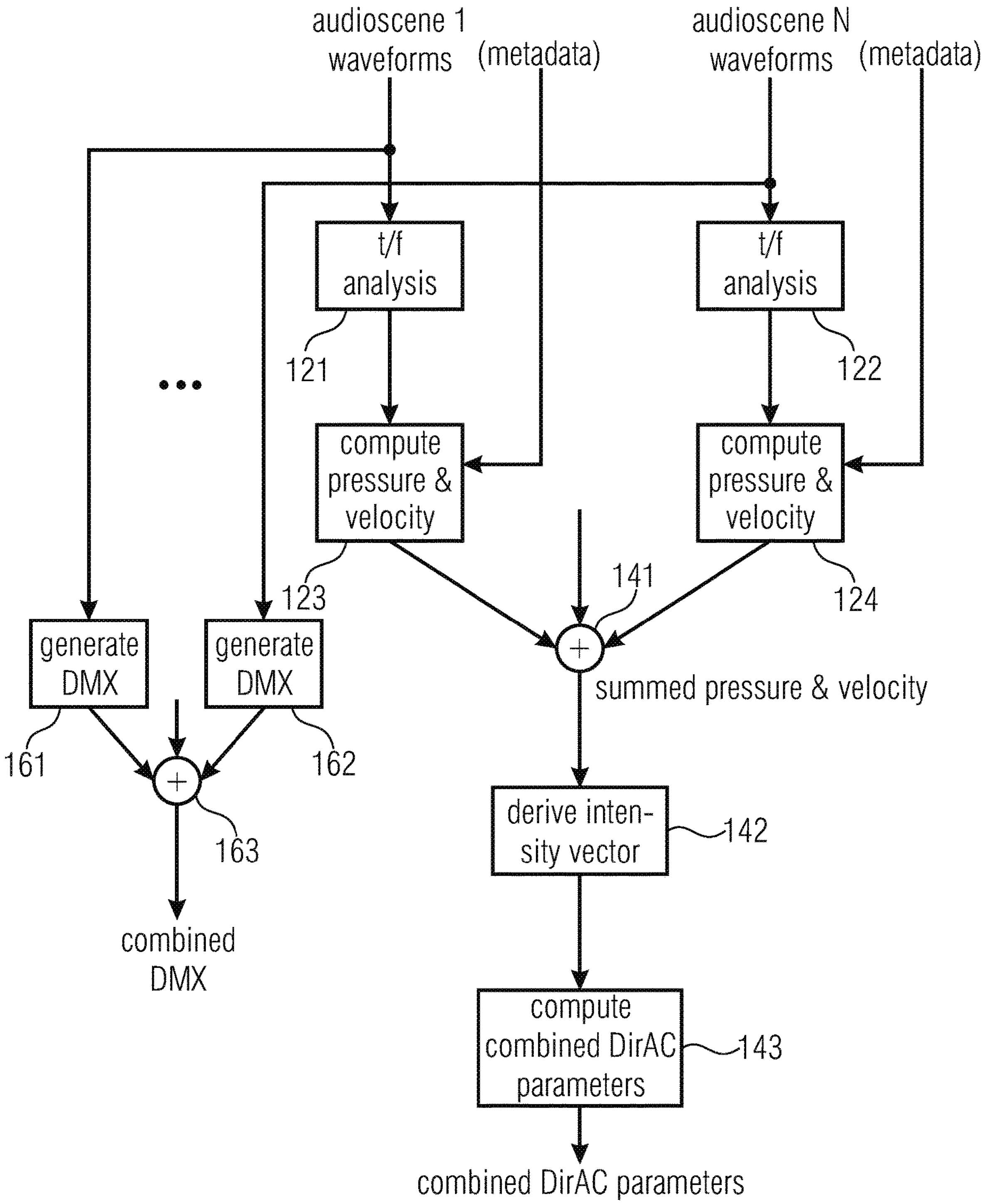
FIG. 1*b* is an implementation of the generation of a combined audio scene, where the common format is the pressure/velocity representation.
Figure 1C:
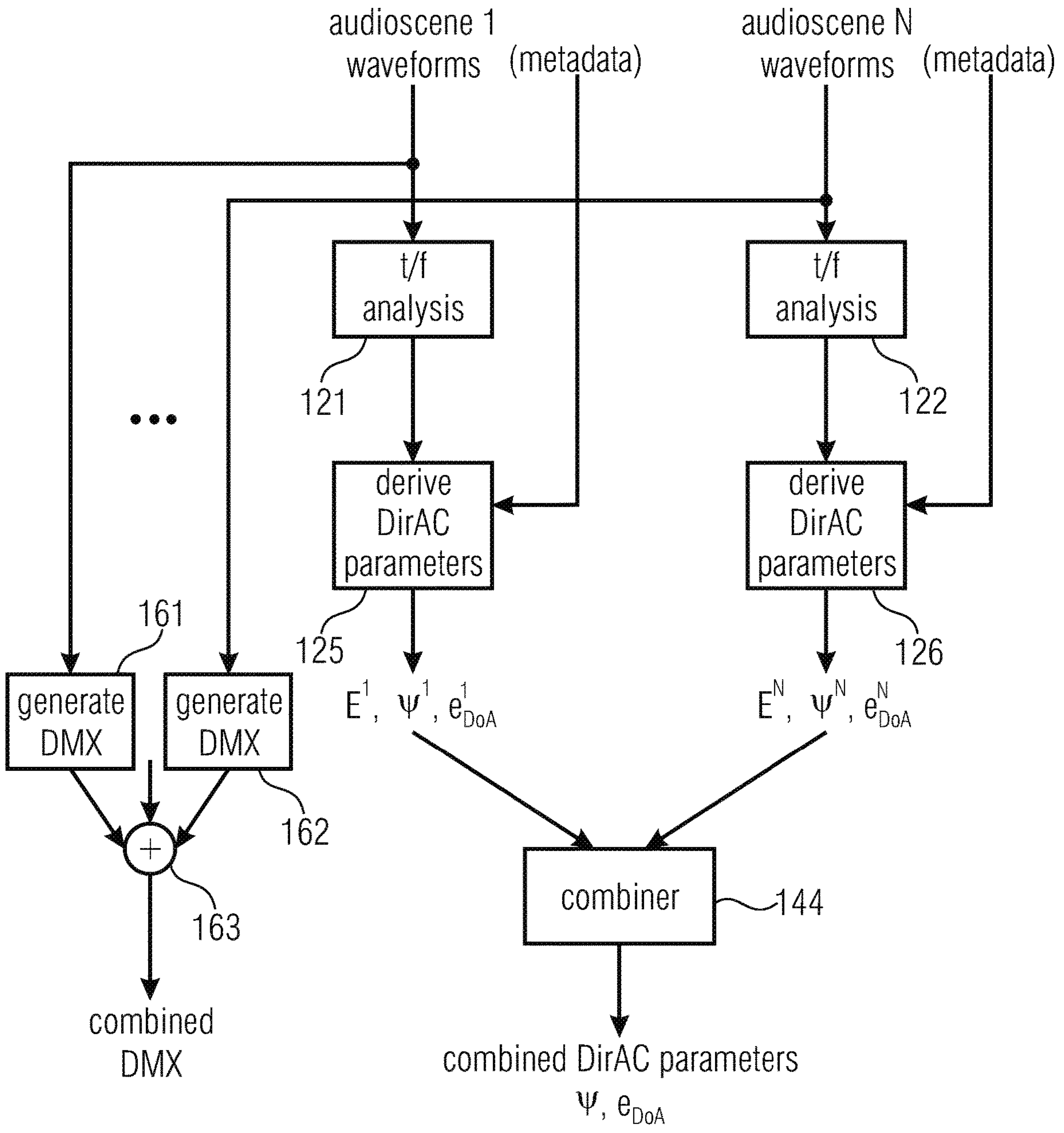
FIG. 1*c* is an implementation of the generation of a combined audio scene, where the DirAC parameters and the DirAC description is the common format.
Figure 1D:
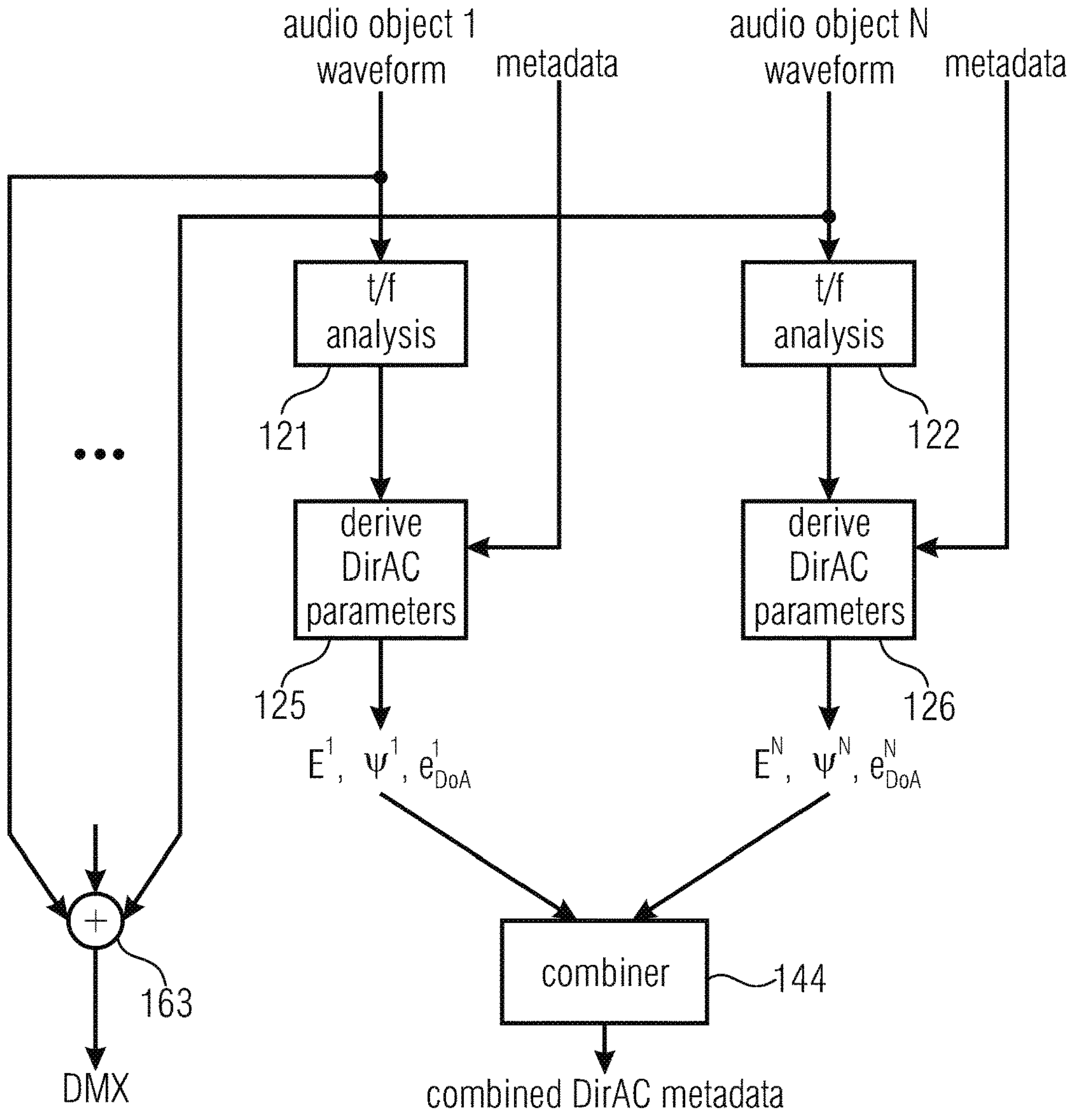
FIG. 1*d* is an implementation of the combiner in FIG. 1*c* illustrating two different alternatives for the implementation of the combiner of DirAC parameters of different audio scenes or audio scene descriptions.
Figure 1E:
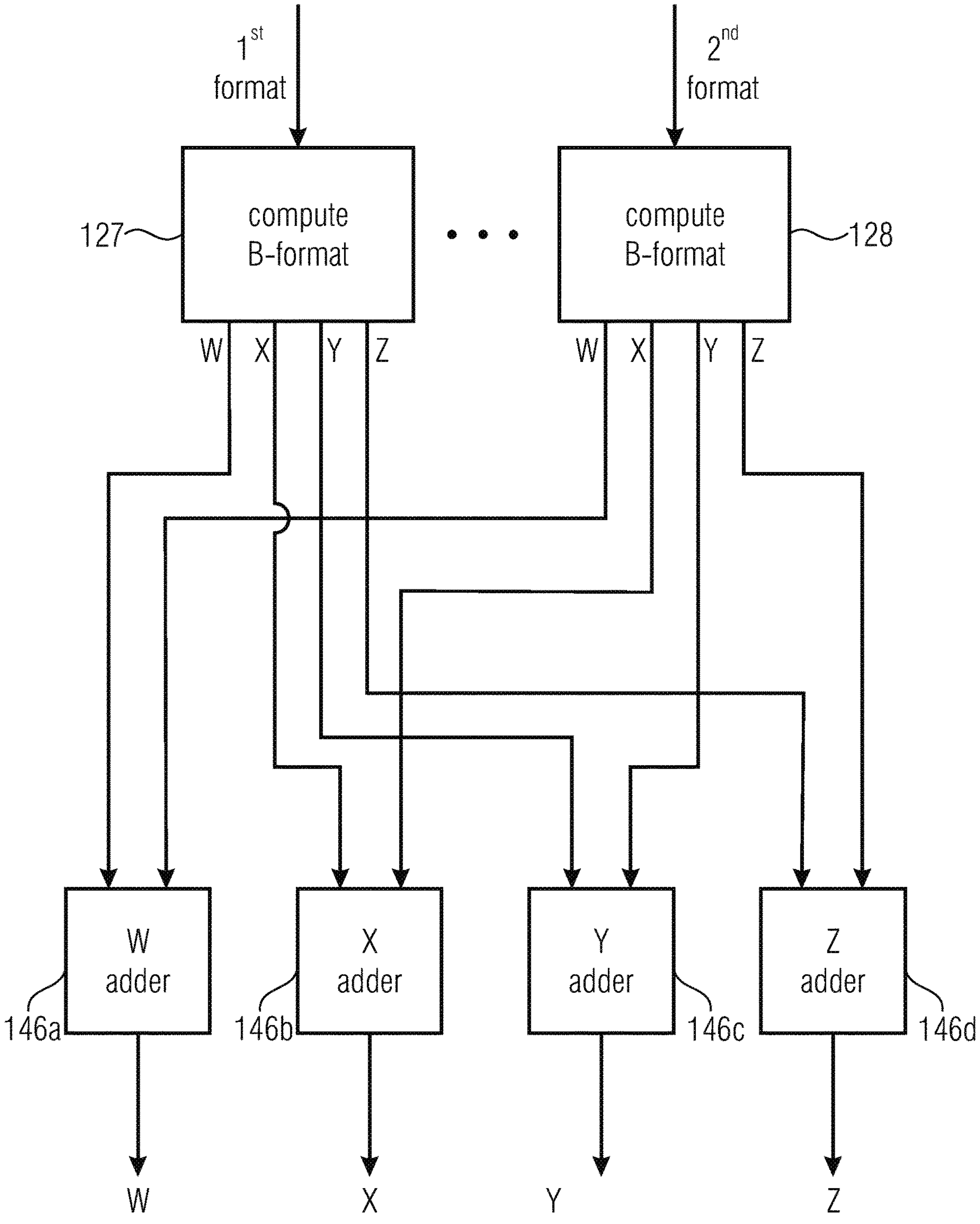
FIG. 1*e* is an implementation of the generation of a combined audio scene where the common format is the B-format as an example for an Ambisonics representation.

In accordance with an embodiment illustrated in FIG. 1*e*, the format converter 120 is configured to convert the first description into a first B-format signal as, for example, illustrated at 127 in FIG. 1*e* and to compute the B-format representation for the second description as illustrated in FIG. 1*e* at 128.

Then, the format combiner 140 is implemented as a component signal adder illustrated at 146*a* for the W component adder, 146*b* for the X component adder, illustrated at 146*c* for the Y component adder and illustrated at 146*d* for the Z component adder.

Thus, in the FIG. 1*e* embodiment, the combined audio scene can be a B-format representation and the B-format signals can then operate as the transport channels and can then be encoded via a transport channel encoder 170 of FIG. 1*a*. Thus, the combined audio scene with respect to B-format signal can be directly input into the encoder 170 of FIG. 1*a* to generate an encoded B-format signal that could then be output via the output interface 200. In this case, any spatial metadata are not required, but, at the price of an encoded representation of four audio signals, i.e., the omnidirectional component W and the directional components X, Y, Z.

Alternatively, the common format is the pressure/velocity format as illustrated in FIG. 1*b*. To this end, the format converter 120 comprises a time/frequency analyzer 121 for the first audio scene and the time/frequency analyzer 122 for the second audio scene or, generally, the audio scene with number N, where N is an integer number.

Then, for each such spectral representation generated by the spectral converters 121, 122, pressure and velocity are computed as illustrated at 123 and 124, and, the format combiner then is configured to calculate a summed pressure signal on the one hand by summing the corresponding pressure signals generated by the blocks 123, 124. And, additionally, an individual velocity signal is calculated as well by each of the blocks 123, 124 and the velocity signals can be added together in order to obtain a combined pressure/velocity signal.

Depending on the implementation, the procedures in blocks 142, 143 does not necessarily have to be performed. Instead, the combined or "summed" pressure signal and the combined or "summed" velocity signal can be encoded in an analogy as illustrated in FIG. 1*e* of the B-format signal and this pressure/velocity representation could be encoded while once again via that encoder 170 of FIG. 1*a* and could then be transmitted to the decoder without any additional side information with respect to spatial parameters, since the combined pressure/velocity representation already includes the spatial information that may be used for obtaining a finally rendered high quality sound field on a decoder-side.

In an embodiment, however, it is advantageous to perform a DirAC analysis to the pressure/velocity representation generated by block 141. To this end, the intensity vector 142 is calculated and, in block 143, the DirAC parameters from the intensity vector is calculated, and, then, the combined DirAC parameters are obtained as a parametric representation of the combined audio scene. To this end, the DirAC analyzer 180 of FIG. 1*a* is implemented to perform the functionality of block 142 and 143 of FIG. 1*b*. And, advantageously, the DirAC data is additionally subjected to a metadata encoding operation in metadata encoder 190. The metadata encoder 190 typically comprises a quantizer and entropy coder in order to reduce the bitrate that may be used for the transmission of the DirAC parameters.

Together with the encoded DirAC parameters, an encoded transport channel is also transmitted. The encoded transport channel is generated by the transport channel generator 160 of FIG. 1*a* that can, for example, be implemented as illustrated in FIG. 1*b* by a first downmix generator 161 for generating a downmix from the first audio scene and a N-th downmix generator 162 for generating a downmix from the N-th audio scene.

Then, the downmix channels are combined in combiner 163 typically by a straight-forward addition and the combined downmix signal is then the transport channel that is encoded by the encoder 170 of FIG. 1*a*. The combined downmix can, for example, be a stereo pair, i.e., a first channel and a second channel of a stereo representation or can be a mono channel, i.e., a single channel signal.

In accordance with a further embodiment illustrated in FIG. 1*c*, a format conversion in the format converter 120 is done to directly convert each of the input audio formats into the DirAC format as the common format. To this end, the format converter 120 once again forms a time-frequency conversion or a time/frequency analysis in corresponding blocks 121 for the first scene and block 122 for a second or further scene. Then, DirAC parameters are derived from the spectral representations of the corresponding audio scenes illustrated at 125 and 126. The result of the procedure in blocks 125 and 126 are DirAC parameters consisting of energy information per time/frequency tile, a direction of arrival information $e_{DOA}$ per time/frequency tile and a diffuseness information ψ for each time/frequency tile. Then, the format combiner 140 is configured to perform a combination directly in the DirAC parameter domain in order to generate combined DirAC parameters ψ for the diffuseness and $e_{DOA}$ for the direction of arrival. Particularly, the energy information $E_1$ and $E_N$ may be used by the combiner 144 but are not part of the final combined parametric representation generated by the format combiner 140.

Thus, comparing FIG. 1*c* to FIG. 1*e* reveals that, when the format combiner 140 already performs a combination in the DirAC parameter domain, the DirAC analyzer 180 is not necessary and not implemented. Instead, the output of the format combiner 140 being the output of block 144 in FIG. 1*c* is directly forwarded to the metadata encoder 190 of FIG. 1*a* and from there into the output interface 200 so that the encoded spatial metadata and, particularly, the encoded combined DirAC parameters are included in the encoded output signal output by the output interface 200.

Furthermore, the transport channel generator 160 of FIG. 1*a* may receive, already from the input interface 100, a waveform signal representation for the first scene and the waveform signal representation for the second scene. These representations are input into the downmix generator blocks 161, 162 and the results are added in block 163 to obtain a combined downmix as illustrated with respect to FIG. 1*b*.

FIG. 1*d* illustrates a similar representation with respect to FIG. 1*c*. However, in FIG. 1*d*, the audio object waveform is input into the time/frequency representation converter 121 for audio object 1 and 122 for audio object N. Additionally, the metadata are input, together with the spectral representation into the DirAC parameter calculators 125, 126 as illustrated also in FIG. 1*c*.

However, FIG. 1*d* provides a more detailed representation with respect to how advantageous implementations of the combiner 144 operate. In a first alternative, the combiner performs an energy-weighted addition of the individual diffuseness for each individual object or scene and, a corresponding energy-weighted calculation of a combined DoA for each time/frequency tile is performed as illustrated in the lower equation of alternative 1.

However, other implementations can be performed as well. Particularly, another very efficient calculation is set the diffuseness to zero for the combined DirAC metadata and to select, as the direction of arrival for each time/frequency tile the direction of arrival calculated from a certain audio object that has the highest energy within the specific time/frequency tile. Advantageously, the procedure in FIG. 1*d* is more appropriate when the input into the input interface are individual audio objects correspondingly represented a waveform or mono-signal for each object and corresponding metadata such as position information illustrated with respect to FIG. 16*a* or 16*b*.

However, in the FIG. 1*c* embodiment, the audio scene may be any other of the representations illustrated in FIG. 16*c*, 16*d*, 16*e* or 16*f*. Then, there can be metadata or not, i.e., the metadata in FIG. 1*c* is optional. Then, however, a typically useful diffuseness is calculated for a certain scene description such as an Ambisonics scene description in FIG.

16*e* and, then, the first alternative of the way how the parameters are combined is advantageous compared to the second alternative of FIG. 1*d*. Therefore, in accordance with the invention, the format converter 120 is configured to convert a high order Ambisonics or a first order Ambisonics format into the B-format, wherein the high order Ambisonics format is truncated before being converted into the B-format.

In a further embodiment, the format converter is configured to project an object or a channel on spherical harmonics at the reference position to obtain projected signals, and wherein the format combiner is configured to combine the projection signals to obtain B-format coefficients, wherein the object or the channel is located in space at a specified position and has an optional individual distance from a reference position. This procedure particularly works well for the conversion of object signals or multichannel signals into first order or high order Ambisonics signals.

In a further alternative, the format converter 120 is configured to perform a DirAC analysis comprising a time-frequency analysis of B-format components and a determination of pressure and velocity vectors and where the format combiner is then configured to combine different pressure/velocity vectors and where the format combiner further comprises the DirAC analyzer 180 for deriving DirAC metadata from the combined pressure/velocity data.

In a further alternative embodiment, the format converter is configured to extract the DirAC parameters directly from the object metadata of an audio object format as the first or second format, where the pressure vector for the DirAC representation is the object waveform signal and the direction is derived from the object position in space or the diffuseness is directly given in the object metadata or is set to a default value such as the zero value.

In a further embodiment, the format converter is configured to convert the DirAC parameters derived from the object data format into pressure/velocity data and the format combiner is configured to combine the pressure/velocity data with pressure/velocity data derived from different description of one or more different audio objects.

However, in an implementation illustrated with respect to FIGS. 1*c* and 1*d*, the format combiner is configured to directly combine the DirAC parameters derived by the format converter 120 so that the combined audio scene generated by block 140 of FIG. 1*a* is already the final result and a DirAC analyzer 180 illustrated in FIG. 1*a* is not necessary, since the data output by the format combiner 140 is already in the DirAC format.

Figure 1F:
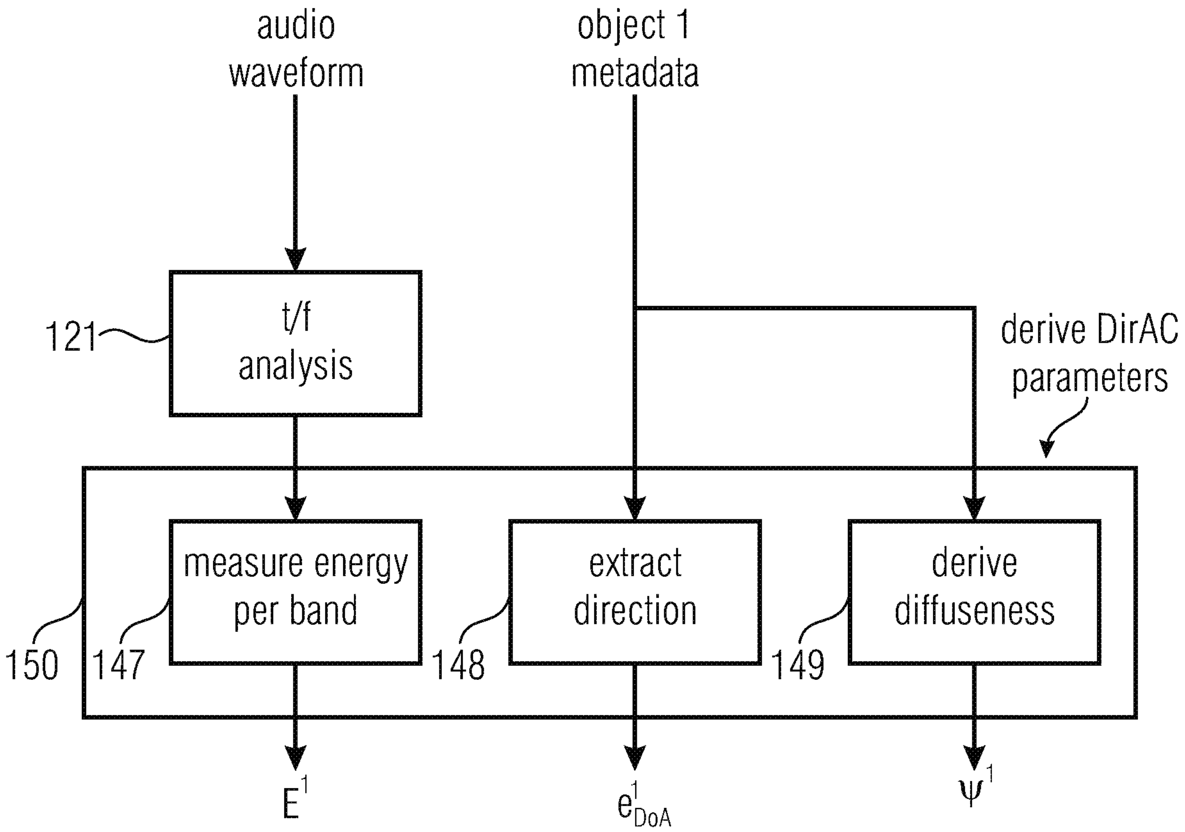
FIG. 1*f* is an illustration of an audio object/DirAC converter useful in the context of, of example, FIG. 1*c* or 1*d* or useful in the context of the third aspect relating to a metadata converter.

In a further implementation, the format converter 120 already comprises a DirAC analyzer for first order Ambisonics or a high order Ambisonics input format or a multichannel signal format. Furthermore, the format converter comprises a metadata converter for converting the object metadata into DirAC metadata, and such a metadata converter is, for example, illustrated in FIG. 1*f* at 150 that once again operates on the time/frequency analysis in block 121 and calculates the energy per band per time frame illustrated at 147, the direction of arrival illustrated at block 148 of FIG. 1*f* and the diffuseness illustrated at block 149 of FIG. 1*f*. And, the metadata are combined by the combiner 144 for combining the individual DirAC metadata streams, advantageously by a weighted addition as illustrated exemplarily by one of the two alternatives of the FIG. 1*d* embodiment.

Figure 1G:
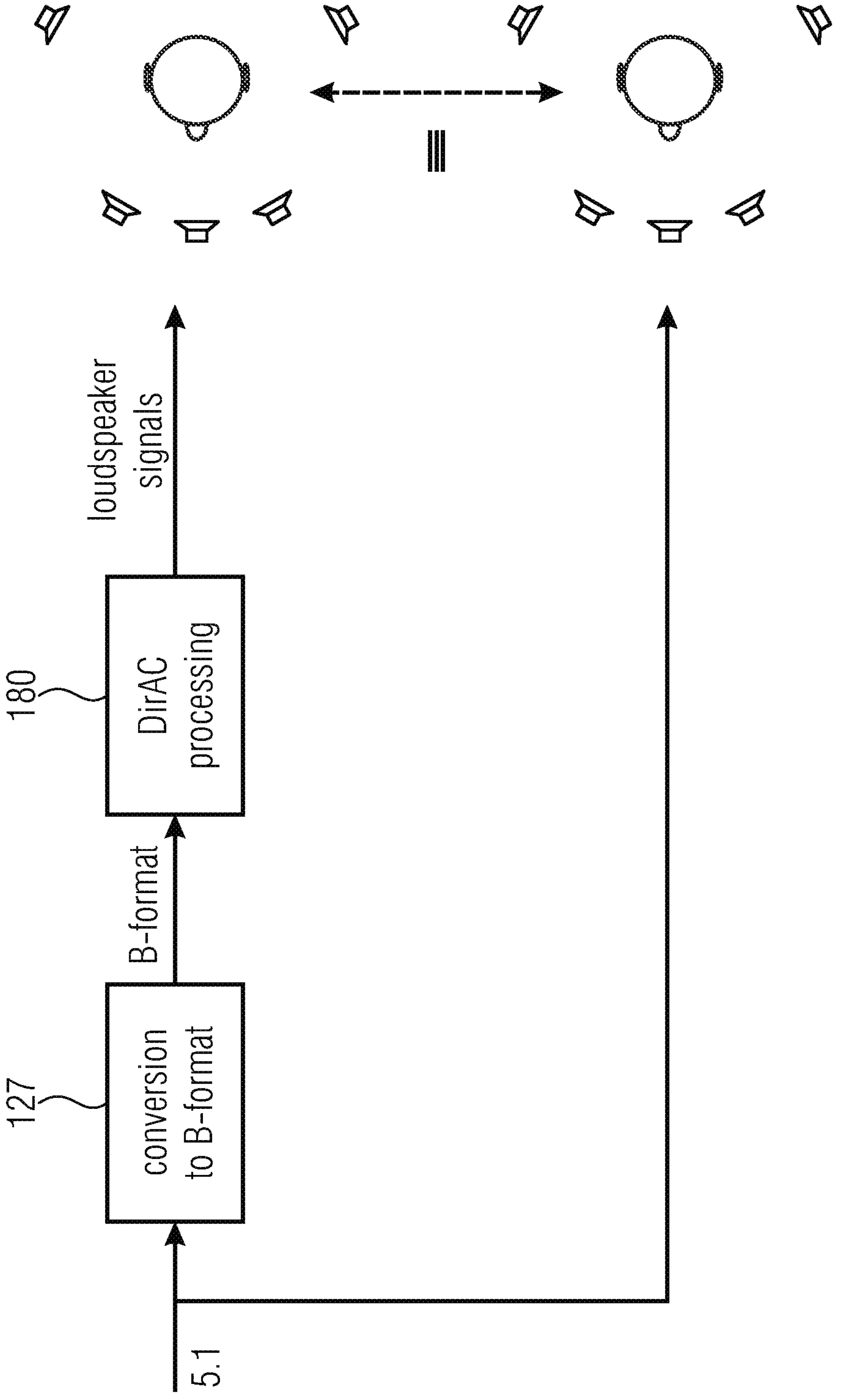
FIG. 1*g* is an exemplary illustration of a 5.1 multichannel signal into a DirAC description.

Multichannel channel signals can be directly converted to B-format. The obtained B-format can be then processed by a conventional DirAC. FIG. 1*g* illustrates a conversion 127 to B-format and a subsequent DirAC processing 180.

Reference [3] outlines ways to perform the conversion from multi-channel signal to B-format. In principle, converting multi-channel audio signals to B-format is simple: virtual loudspeakers are defined to be at different positions of the loudspeaker layout. For example for 5.0 layout, loudspeakers are positioned on the horizontal plane at azimuth angles +/−30 and +/−110 degrees. A virtual B-format microphone is then defined to be in the center of the loudspeakers, and a virtual recording is performed. Hence, the W channel is created by summing all loudspeaker channels of the 5.0 audio file. The process for getting W and other B-format coefficients can be then summarized:

$$W = \sum_{i=1}^{k} \sqrt{\frac{1}{2}}\, w_i s_i$$

$$X = \sum_{i=1}^{k} w_i s_i(\cos(\theta_i)\cos(\varphi_i))$$

$$Y = \sum_{i=1}^{k} w_i s_i(\sin(\theta_i)\cos(\varphi_i))$$

$$Z = \sum_{i=1}^{k} w_i s_i(\sin(\varphi_i))$$

where $s_i$ are the multichannel signals located in the space at the loudspeaker positions defined by the azimuth angle $\theta_i$ and elevation angle $\varphi_i$, of each loudspeaker and $w_i$ are weights function of the distance. If the distance is not available or simply ignored, then $w_i=1$. Though, this simple technique is limited since it is an irreversible process. Moreover since the loudspeaker are usually distributed non-uniformly, there is also a bias in the estimation done by a subsequent DirAC analysis towards the direction with the highest loudspeaker density. For example in 5.1 layout, there will be a bias towards the front since there are more loudspeakers in the front than in the back.

Figure 1H:
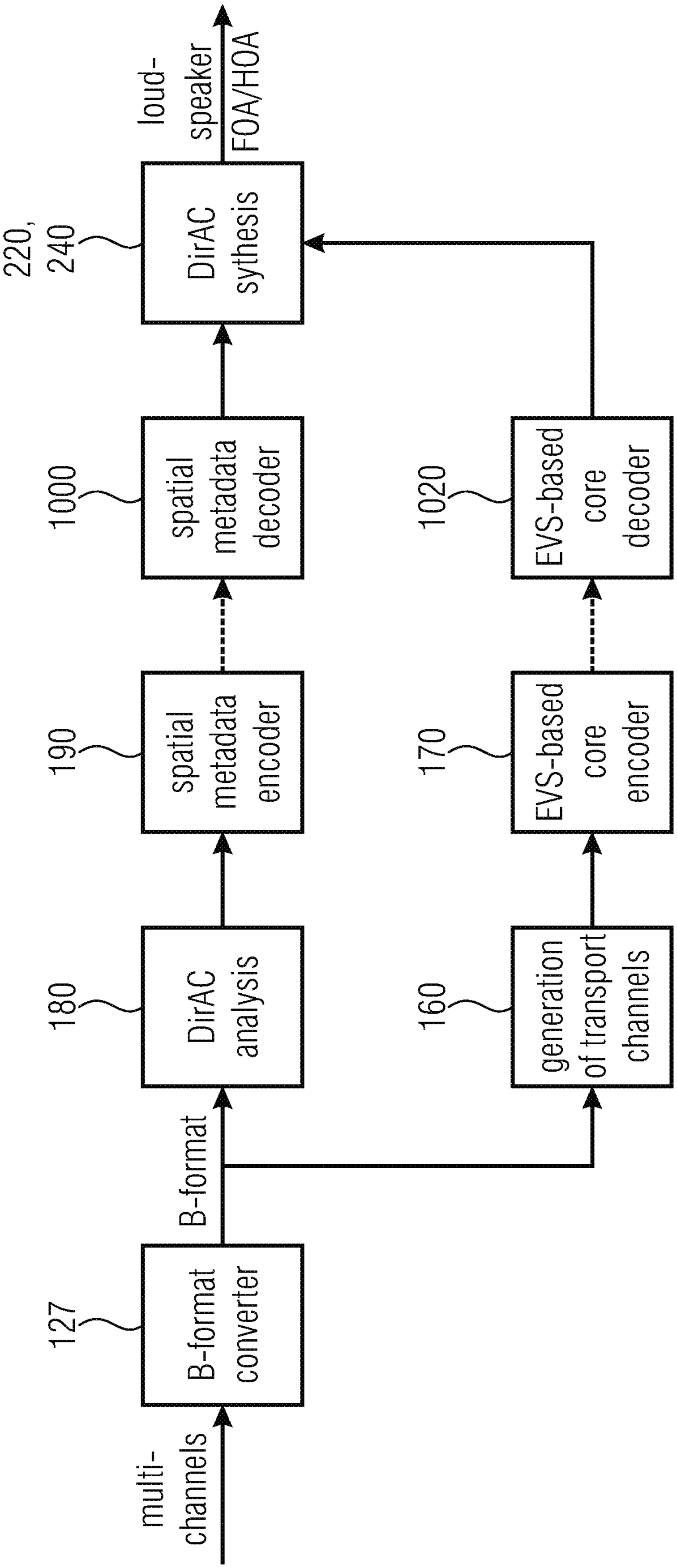
FIG. 1*h* is a further illustration the conversion of a multichannel format into the DirAC format in the context of an encoder and a decoder side.

To address this issue, a further technique was proposed in [3] for processing 5.1 multichannel signal with DirAC. The final coding scheme will then look as illustrated in FIG. 1*h* showing the B-format converter 127, the DirAC analyzer 180 as generally described with respect to element 180 in FIG. 1, and the other elements 190, 1000, 160, 170, 1020, and/or 220, 240.

In a further embodiment, the output interface 200 is configured to add, to the combined format, a separate object description for an audio object, where the object description comprises at least one of a direction, a distance, a diffuseness or any other object attribute, where this object has a single direction throughout all frequency bands and is either static or moving slower than a velocity threshold.

Figure 4A:
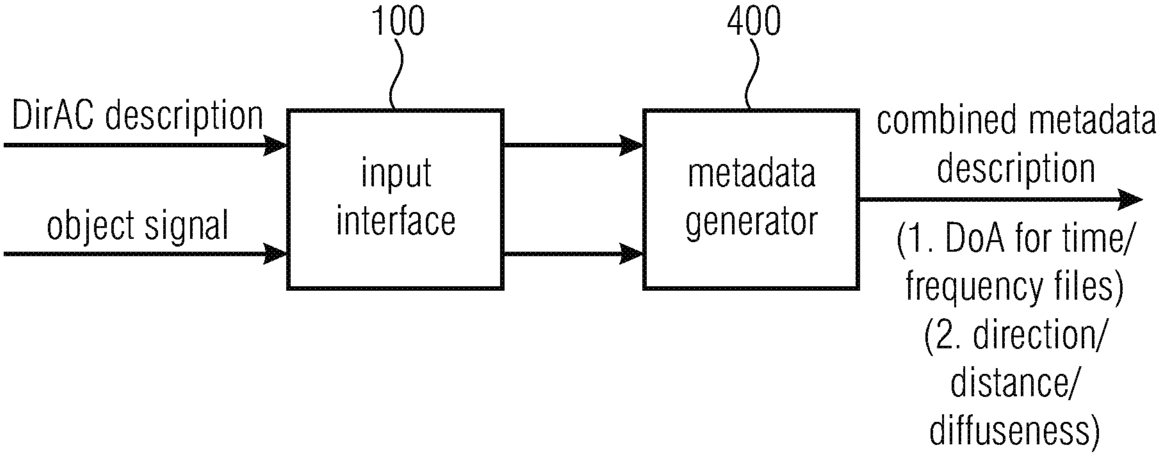
FIG. 4*a* illustrates an implementation of an audio scene encoder in accordance with a fourth aspect of the present invention for generating a combined metadata description comprising the DirAC metadata and the object metadata.
Figure 4B:
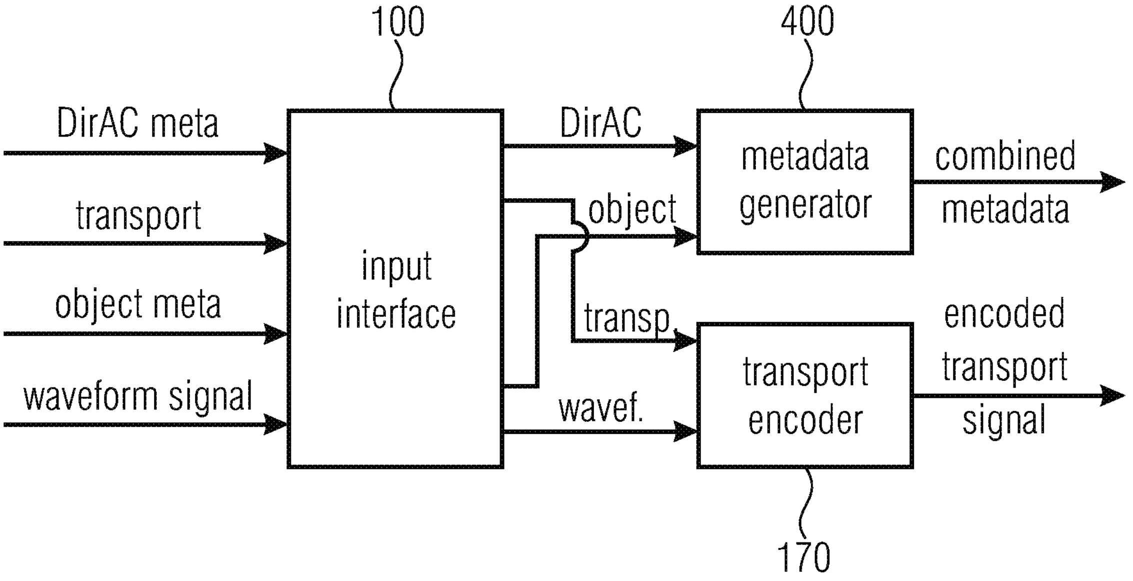
FIG. 4*b* illustrates an embodiment with respect to the fourth aspect of the present invention.

This feature is furthermore elaborated in more detail with respect to the fourth aspect of the present invention discussed with respect to FIG. 4*a* and FIG. 4*b*.

1st Encoding Alternative: Combining and Processing Different Audio Representations Through B-Format or Equivalent Representation A first realization of the envisioned encoder can be achieved by converting all input format into a combined B-format as it is depicted in FIG. 11.

Figure 11:
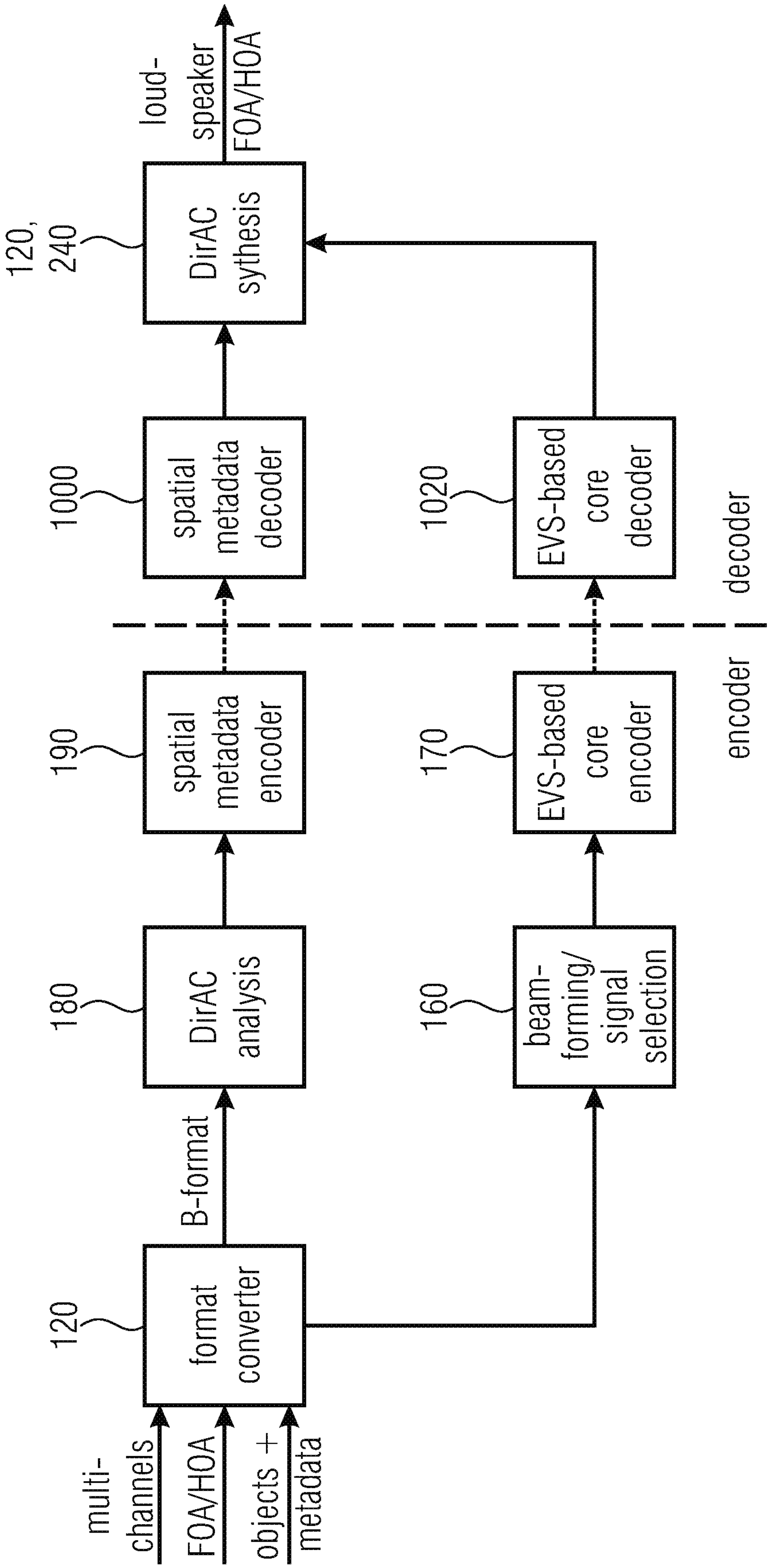
FIG. 11 is a system overview of the DirAC-based encoder/decoder combining different input formats in a combined B-format.

FIG. 11: System overview of the DirAC-based encoder/decoder combining different input formats in a combined B-format Since DirAC is originally designed for analyzing a B-format signal, the system converts the different audio formats to a combined B-format signal. The formats are first individually converted 120 into a B-format signal before being combined together by summing their B-format components W,X,Y,Z. First Order Ambisonics (FOA) components can be normalized and re-ordered to a B-format. Assuming FOA is in ACN/N3D format, the four signals of the B-format input are obtained by:

$$\begin{cases} W = Y_0^0 \\ X = \sqrt{\frac{2}{3}}\, Y_1^1 \\ Y = \sqrt{\frac{2}{3}}\, Y_1^{-1} \\ Z = \sqrt{\frac{2}{3}}\, Y_1^0 \end{cases}$$

Where $Y_m^l$ denotes the Ambisonics component of order l and index m, $-l \le m \le +l$. Since FOA components are fully contained in higher order Ambisonics format, HOA format needs only to be truncated before being converted into B-format.

Since objects and channels have determined positions in the space, it is possible to project each individual object and channel on spherical Harmonics (SH) at the center position such as recording or reference position. The sum of the projections allows combining different objects and multiple channels in a single B-format and can be then processed by the DirAC analysis. The B-format coefficients (W,X,Y,Z) are then given by:

$$W = \sum_{i=1}^{k} \sqrt{\frac{1}{2}}\, w_i s_i$$

$$X = \sum_{i=1}^{k} w_i s_i (\cos(\theta_i)\cos(\varphi_i))$$

$$Y = \sum_{i=1}^{k} w_i s_i (\sin(\theta_i)\cos(\varphi_i))$$

$$Z = \sum_{i=1}^{k} w_i s_i (\sin(\varphi_i))$$

where $s_i$ are independent signals located in the space at positions defined by the azimuth angle $\theta_i$ and elevation angle $\varphi_i$, and $w_i$ are weights function of the distance. If the distance is not available or simply ignored, then $w_i=1$. For example, the independent signals can correspond to audio objects that are located at the given position or the signal associated with a loudspeaker channel at the specified position.

In applications where an Ambisonics representation of orders higher than first order is desired, the Ambisonics coefficients generation presented above for first order is extended by additionally considering higher-order components.

The transport channel generator 160 can directly receive the multichannel signal, objects waveform signals, and the higher order Ambisonics components. The transport channel generator will reduce the number of input channels to transmit by downmixing them. The channels can be mixed together as in MPEG surround in a mono or stereo downmix, while object waveform signals can be summed up in a passive way into a mono downmix. In addition, from the higher order Ambisonics, it is possible to extract a lower order representation or to create by beamforming a stereo downmix or any other sectioning of the space. If the downmixes obtained from the different input format are compatible with each other, they can be combined together by a simple addition operation.

Alternatively, the transport channel generator 160 can receive the same combined B-format as that conveyed to the DirAC analysis. In this case, a subset of the components or the result of a beamforming (or other processing) form the transport channels to be coded and transmitted to the decoder. In the proposed system, a conventional audio coding may be used which can be based on, but is not limited to, the standard 3GPP EVS codec. 3GPP EVS is the advantageous codec choice because of its ability to code either speech or music signals at low bit-rates with high quality while requiring a relatively low delay enabling real-time communications.

At a very low bit-rate, the number of channels to transmit needs to be limited to one and therefore only the omnidirectional microphone signal W of the B-format is transmitted. If bit-rate allows, the number of transport channels can be increased by selecting a subset of the B-format components. Alternatively, the B-format signals can be combined into a beamformer 160 steered to specific partitions of the space. As an example two cardioids can be designed to point at opposite directions, for example to the left and the right of the spatial scene:

$$\begin{cases} L = \sqrt{2}\, W + Y \\ R = \sqrt{2}\, W - Y \end{cases}$$

These two stereo channels L and R can be then efficiently coded 170 by a joint stereo coding. The two signals will be then adequately exploited by the DirAC Synthesis at the decoder side for rendering the sound scene. Other beamforming can be envisioned, for example a virtual cardioid microphone can be pointed toward any directions of given azimuth θ and elevation φ:

$$C = \sqrt{2}\, W + \cos(\theta)\cos(\varphi)X + \sin(\theta)\cos(\varphi)Y + \sin(\varphi)Z$$

Further ways of forming transmission channels can be envisioned that carry more spatial information than a single monophonic transmission channel would do. Alternatively, the 4 coefficients of the B-format can be directly transmitted. In that case the DirAC metadata can be extracted directly at the decoder side, without the need of transmitting extra information for the spatial metadata.

Figure 12:
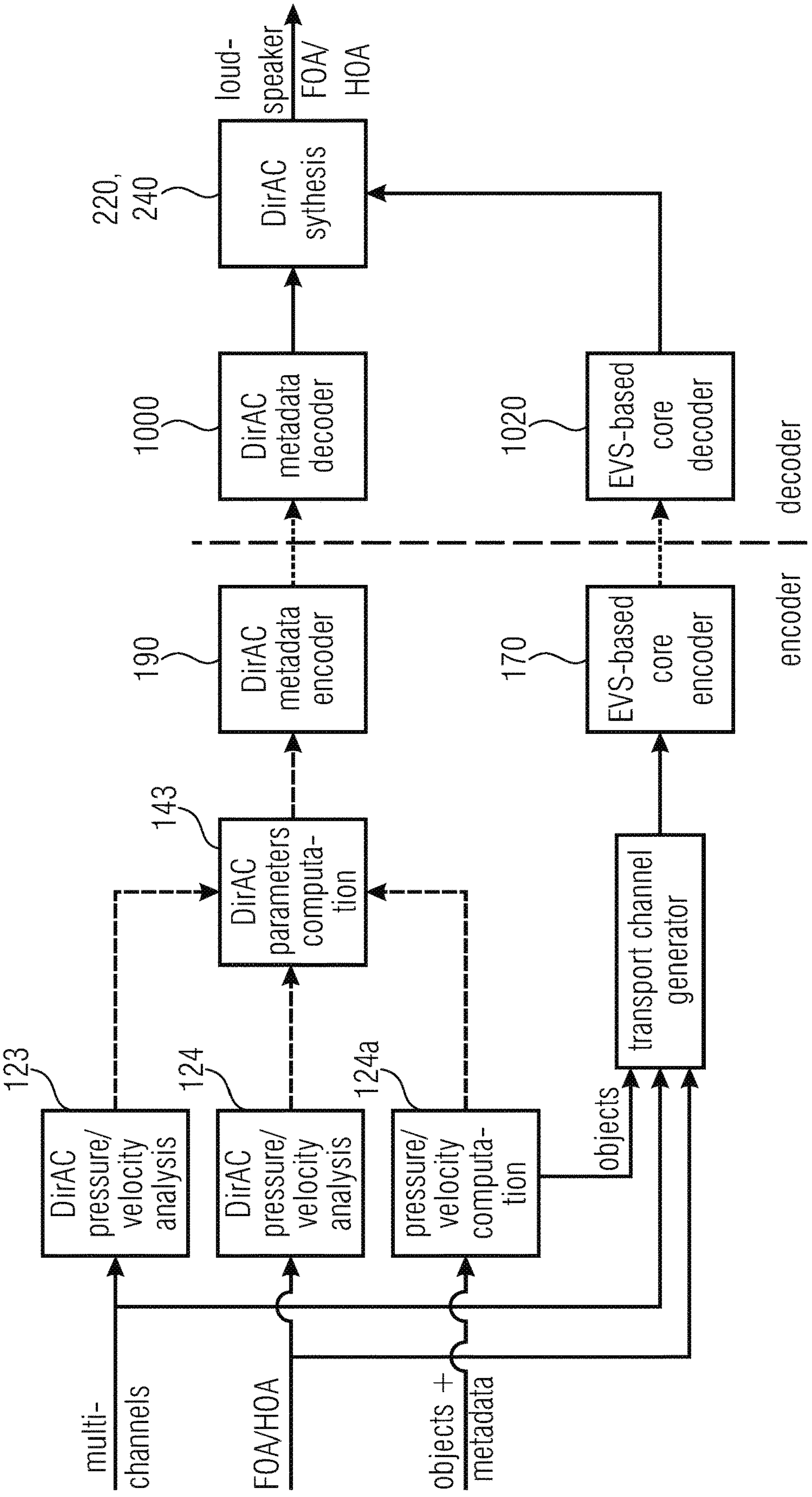
FIG. 12 is a system overview of the DirAC-based encoder/decoder combining in the pressure/velocity domain.

FIG. 12 shows another alternative method for combining the different input formats. FIG. 12 also is a system overview of the DirAC-based encoder/decoder combining in Pressure/velocity domain.

Both multichannel signal and Ambisonics components are input to a DirAC analysis 123, 124. For each input format a DirAC analysis is performed consisting of a time-frequency analysis of the B-format components $w^i(n)$, $x^i(n)$, $y^i(n)$, $z^i(n)$ and the determination of the pressure and velocity vectors:

$$P^i(n,k) = W^i(k,n)$$
$$U^i(n,k) = X^i(k,n)e_x + Y^i(k,n)e_y + Z^i(k,n)e_z$$

where i is the index of the input and, k and n time and frequency indices of the time-frequency tile, and $e_x$, $e_y$, $e_z$ represent the Cartesian unit vectors.

P(n, k) and U(n, k) may be used to compute the DirAC parameters, namely DOA and diffuseness. The DirAC metadata combiner can exploit that N sources which play together result in a linear combination of their pressures and particle velocities that would be measured when they are played alone. The combined quantities are then derived by:

$$P(n,k) = \sum_{i=1}^{N} P^i(n,k)$$
$$U(n,k) = \sum_{i=1}^{N} U^i(n,k)$$

The combined DirAC parameters are computed 143 through the computation of the combined intensity vector:

$$I(k,n) = \frac{1}{2}\Re\{P(k,n).\overline{U(k,n)}\},$$

where $\overline{(\cdot)}$ denotes complex conjugation. The diffuseness of the combined sound field is given by:

$$\psi(k,n) = 1 - \frac{\|E\{I(k,n)\}\|}{cE\{E(k,n)\}}$$

where E{·} denotes the temporal averaging operator, c the speed of sound and E(k,n) the sound field energy given by:

$$E(k,n) = \frac{\rho_0}{4}\|U(k,n)\|^2 + \frac{1}{\rho_0 c^2}|P(k,n)|^2$$

The direction of arrival (DOA) is expressed by means of the unit vector $e_{DOA}(k,n)$, defined as $$e_{DOA}(k,n) = -\frac{1(k,n)}{\|I(k,n)\|}$$

If an audio object is input, the DirAC parameters can be directly extracted from the object metadata while the pressure vector $P^i(k, n)$ is the object essence (waveform) signal. More precisely, the direction is straightforwardly derived from the object position in the space, while the diffuseness is directly given in the object metadata or—if not available—can be set by default to zero. From the DirAC parameters the pressure and the velocity vectors are directly given by:

$$\hat{P}^i(k,n) = \sqrt{1-\psi^i(k,n)}\,P^i(k,n)$$
$$\hat{U}^i(k,n) = -\frac{1}{\rho_0 c}\hat{P}^i(k,n).e^i_{DOA}(k,n)$$

The combination of objects or the combination of an object with different input formats is then obtained by summing the pressure and velocity vectors as explained previously.

In summary, the combination of different input contributions (Ambisonics, channels, objects) is performed in the pressure/velocity domain and the result is then subsequently converted into direction/diffuseness DirAC parameters. Operating in pressure/velocity domain is the theoretically equivalent to operate in B-format. The main benefit of this alternative compared to the previous one is the possibility to optimize the DirAC analysis according to each input format as it is proposed in [3] for surround format 5.1.

The main drawback of such a fusion in a combined B-format or pressure/velocity domain is that the conversion happening at the front-end of the processing chain is already a bottleneck for the whole coding system. Indeed, converting audio representations from higher-order Ambisonics, objects or channels to a (first-order) B-format signal engenders already a great loss of spatial resolution which cannot be recovered afterwards.

2st Encoding Alternative: Combination and Processing in DirAC Domain

Figure 13:
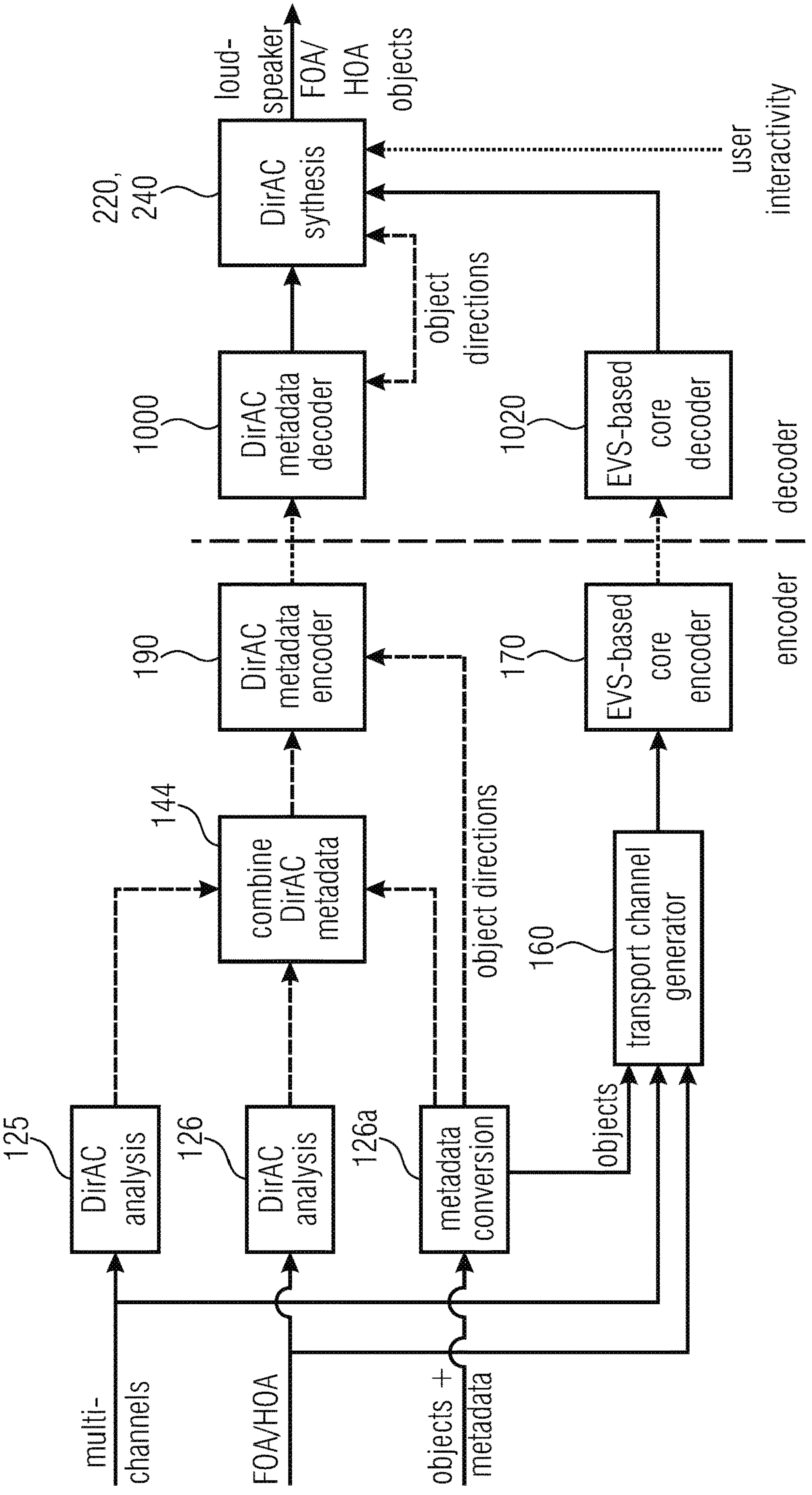
FIG. 13 is a system overview of the DirAC-based encoder/decoder combining different input formats in the DirAC domain with the possibility of object manipulation at the decoder side.

To circumvent the limitations of converting all input formats into a combined B-format signal, the present alternative proposes to derive the DirAC parameters directly from the original format and then to combine them subsequently in the DirAC parameter domain. The general overview of such a system is given in FIG. 13. FIG. 13 is a system overview of the DirAC-based encoder/decoder combining different input formats in DirAC domain with the possibility of object manipulation at the decoder side.

In the following, we can also consider individual channels of a multichannel signal as an audio object input for the coding system. The object metadata is then static over time and represent the loudspeaker position and distance related to listener position.

The objective of this alternative solution is to avoid the systematic combination of the different input formats into to a combined B-format or equivalent representation. The aim is to compute the DirAC parameters before combining them. The method avoids then any biases in the direction and diffuseness estimation due to the combination. Moreover, it can optimally exploit the characteristics of each audio representation during the DirAC analysis or while determining the DirAC parameters.

The combination of the DirAC metadata occurs after determining 125, 126, 126*a* for each input format the DirAC parameters, diffuseness, direction as well as the pressure contained in the transmitted transport channels. The DirAC analysis can estimate the parameters from an intermediate B-format, obtained by converting the input format as explained previously. Alternatively, DirAC parameters can be advantageously estimated without going through B-format but directly from the input format, which might further improve the estimation accuracy. For example in [7], it is proposed to estimate the diffuseness direct from higher order Ambisonics. In case of audio objects, a simple metadata convertor 150 in FIG. 15 can extract from the object metadata direction and diffuseness for each object.

The combination 144 of the several Dirac metadata streams into a single combined DirAC metadata stream can be achieved as proposed in [4]. For some content it is much better to directly estimate the DirAC parameters from the original format rather than converting it to a combined B-format first before performing a DirAC analysis. Indeed, the parameters, direction and diffuseness, can be biased when going to a B-format [3] or when combining the different sources. Moreover, this alternative allows a Another simpler alternative can average the parameters of the different sources by weighting them according to their energies:

$$\psi(k, n) = \frac{1}{\sum_{i=1}^{N} E^i(k, n)} \sum_{i=1}^{N} E^i(k, n)\psi^i(k, n)$$

$$e_{DOA}(k, n) = \frac{1}{\sum_{i=1}^{N} (1 - \psi^i(k, n))E^i(k, n)} \sum_{i=1}^{N} (1 - \psi^i(k, n))E^i(k, n)e^i_{DOA}(k, n)$$

For each object there is the possibility to still send its own direction and optionally distance, diffuseness or any other relevant object attributes as part of the transmitted bitstream from the encoder to the decoder (see e.g., FIGS. 4*a*, 4*b*). This extra side-information will enrich the combined DirAC metadata and will allow the decoder to restitute and or manipulate the object separately. Since an object has a single direction throughout all frequency bands and can be considered either static or slowly moving, the extra information may be updated less frequently than other DirAC parameters and will engender only very low additional bit-rate.

At the decoder side, directional filtering can be performed as educated in [5] for manipulating objects. Directional filtering is based upon a short-time spectral attenuation technique. It is performed in the spectral domain by a zero-phase gain function, which depends upon the direction of the objects. The direction can be contained in the bitstream if directions of objects were transmitted as side-information. Otherwise, the direction could also be given interactively by the user.

3rd Alternative: Combination at Decoder Side

Figure 14:
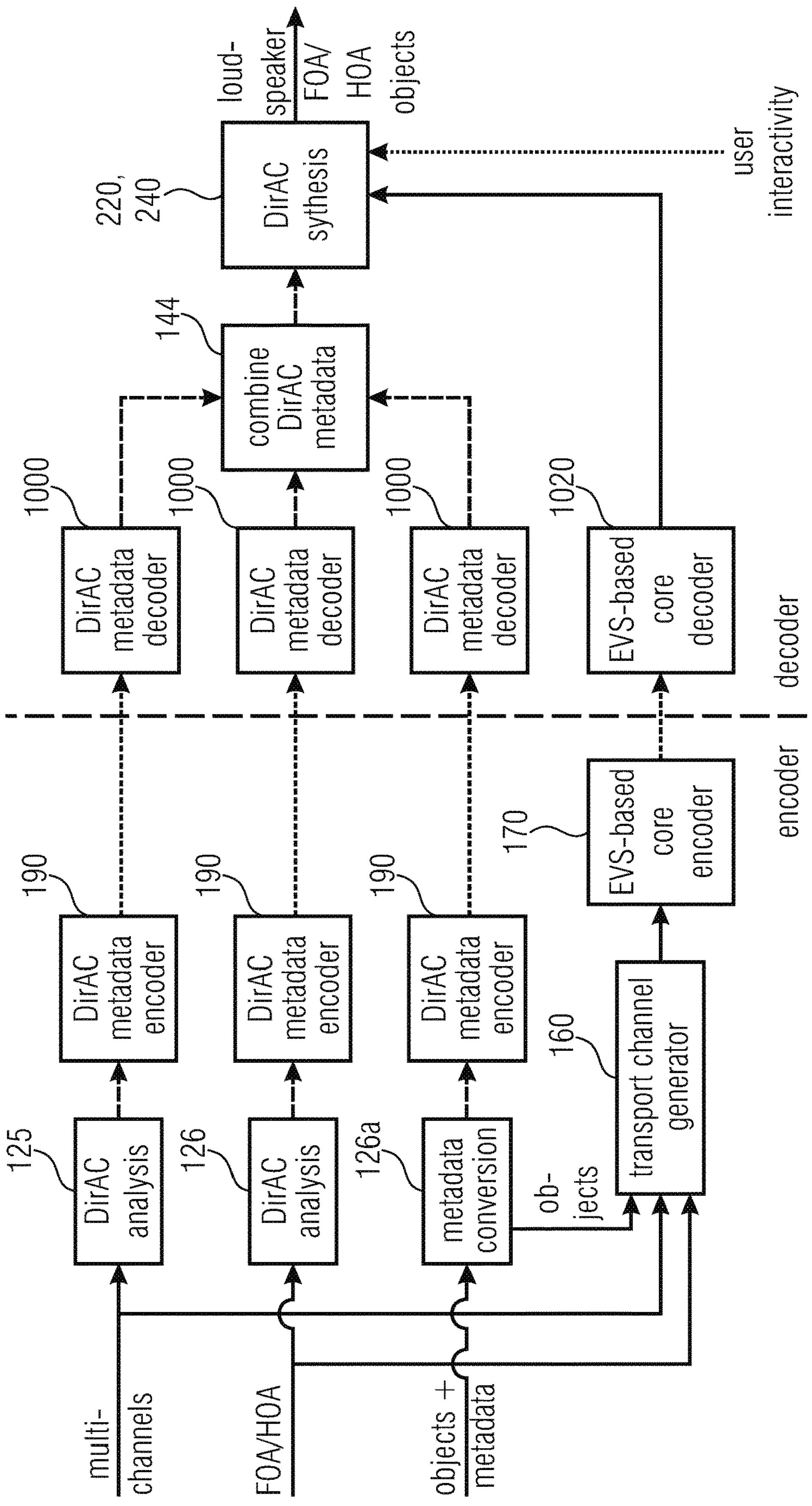
FIG. 14 is a system overview of the DirAC-based encoder/decoder combining different input formats at the decoder-side through a DirAC metadata combiner.

Alternatively, the combination can be performed at the decoder side. FIG. 14 is a system overview of the DirAC-based encoder/decoder combining different input formats at decoder side through a DirAC metadata combiner. In FIG. 14, the DirAC-based coding scheme works at higher bit rates than previously but allows for the transmission of individual DirAC metadata. The different DirAC metadata streams are combined 144 as for example proposed in [4] in the decoder before the DirAC synthesis 220, 240. The DirAC metadata combiner 144 can also obtain the position of an individual object for subsequent manipulation of the object in DirAC analysis.

Figure 15:
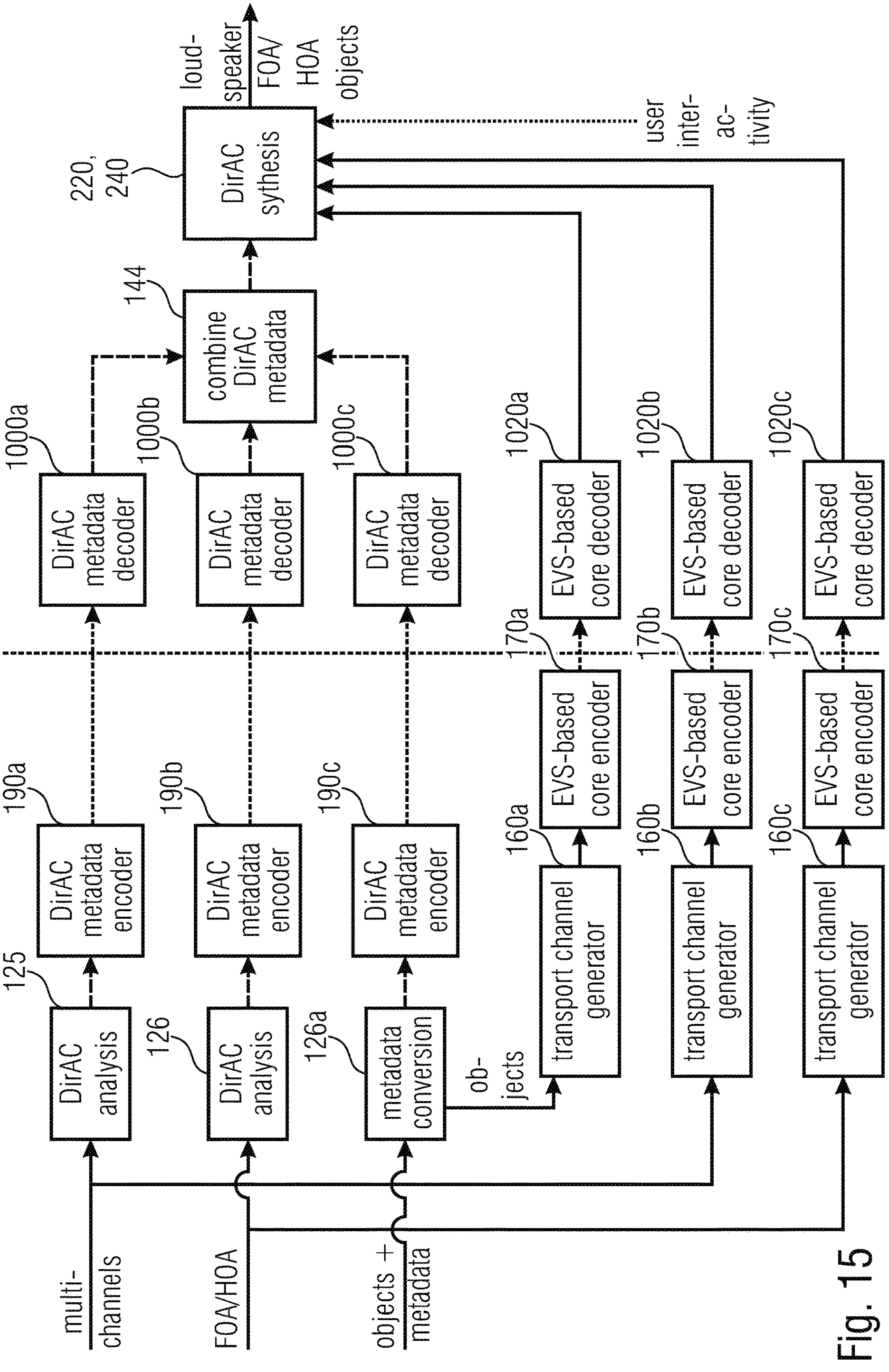
FIG. 15 is a system overview of the DirAC-based encoder/decoder combining different input formats at the decoder-side in the DirAC synthesis.

FIG. 15 is a system overview of the DirAC-based encoder/decoder combining different input formats at decoder side in DirAC synthesis. If bit-rate allows, the system can further be enhanced as proposed in FIG. 15 by sending for each input component (FOA/HOA, MC, Object) its own downmix signal along with its associated DirAC metadata. Still, the different DirAC streams share a common DirAC synthesis 220, 240 at the decoder to reduce complexity.

Figure 2A:
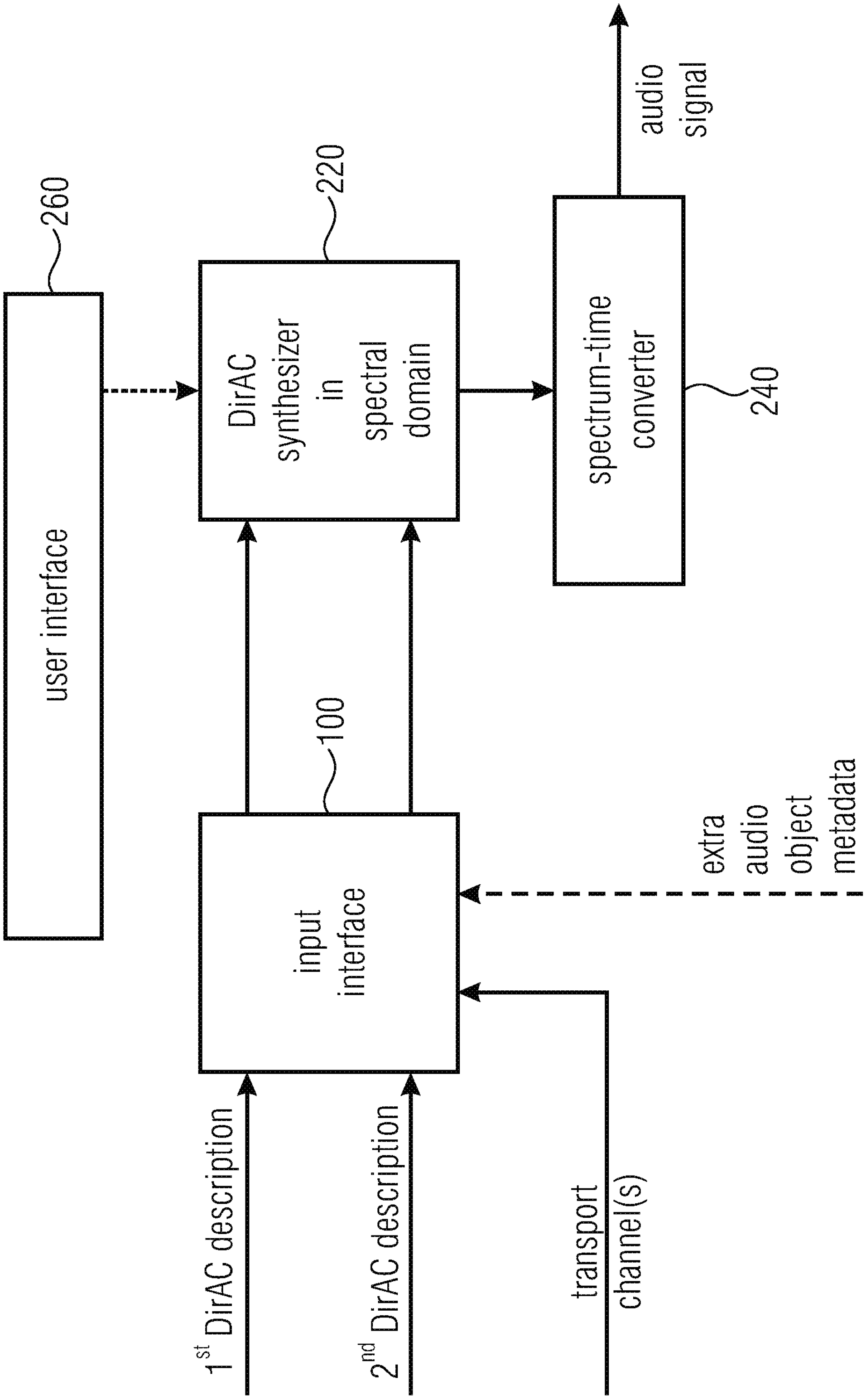
FIG. 2*a* illustrates an embodiment of an apparatus or method for performing a synthesis of a plurality of audio scenes in accordance with a second aspect of the present invention.

FIG. 2*a* illustrates a concept for performing a synthesis of a plurality of audio scenes in accordance with a further, second aspect of the present invention. An apparatus illustrated in FIG. 2*a* comprises an input interface 100 for receiving a first DirAC description of a first scene and for receiving a second DirAC description of a second scene and one or more transport channels.

Furthermore, a DirAC synthesizer 220 is provided for synthesizing the plurality of audio scenes in a spectral domain to obtain a spectral domain audio signal representing the plurality of audio scenes. Furthermore, a spectrum-time converter 214 is provided that converts the spectral domain audio signal into a time domain in order to output a time domain audio signal that can be output by speakers, for example. In this case, the DirAC synthesizer is configured to perform rendering of loudspeaker output signal. Alternatively, the audio signal could be a stereo signal that can be output to a headphone. Again, alternatively, the audio signal output by the spectrum-time converter 214 can be a B-format sound field description. All these signals, i.e., loudspeaker signals for more than two channels, headphone signals or sound field descriptions are time domain signal for further processing such as outputting by speakers or headphones or for transmission or storage in the case of sound field descriptions such as first order Ambisonics signals or higher order Ambisonics signals.

Furthermore, the FIG. 2*a* device additionally comprises a user interface 260 for controlling the DirAC synthesizer 220 in the spectral domain. Additionally, one or more transport channels can be provided to the input interface 100 that are to be used together with the first and second DirAC descriptions that are, in this case, parametric descriptions providing, for each time/frequency tile, a direction of arrival information and, optionally, additionally a diffuseness information.

Figure 2B:
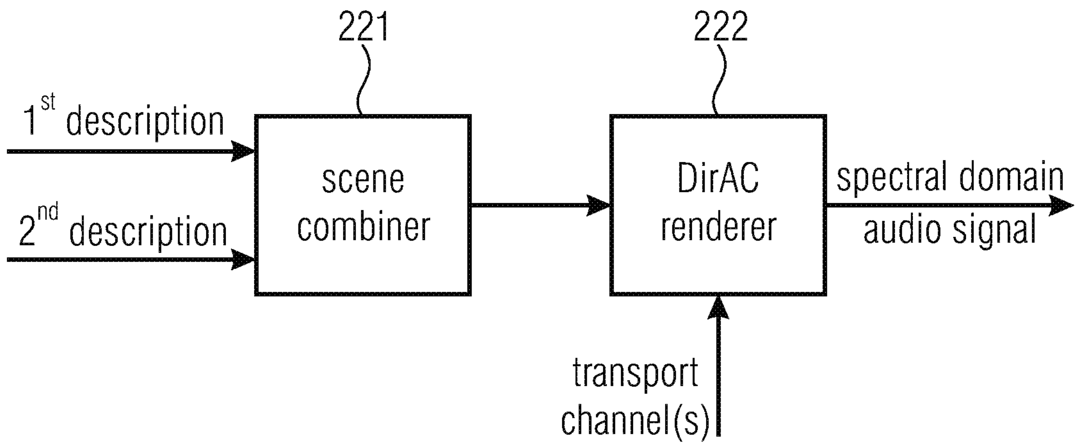
FIG. 2*b* illustrates an implementation of the DirAC synthesizer of FIG. 2*a;*

Typically, the two different DirAC descriptions input into the interface 100 in FIG. 2*a* describe two different audio scenes. In this case, the DirAC synthesizer 220 is configured to perform a combination of these audio scenes. One alternative of the combination is illustrated in FIG. 2*b*. Here, a scene combiner 221 is configured to combine the two DirAC description in the parametric domain, i.e., the parameters are combined to obtain combined direction of arrival (DoA) parameters and optionally diffuseness parameters at the output of block 221. This data is then introduced into to the DirAC renderer 222 that receives, additionally, the one or more transport channels in order to channels in order to obtain the spectral domain audio signal 222. The combination of the DirAC parametric data is advantageously performed as illustrated in FIG. 1*d* and, as is described with respect to this figure and, particularly, with respect to the first alternative.

Should at least one of the two descriptions input into the scene combiner 221 include diffuseness values of zero or no diffuseness values at all, then, additionally, the second alternative can be applied as well as discussed in the context of FIG. 1*d*.

Figure 2C:
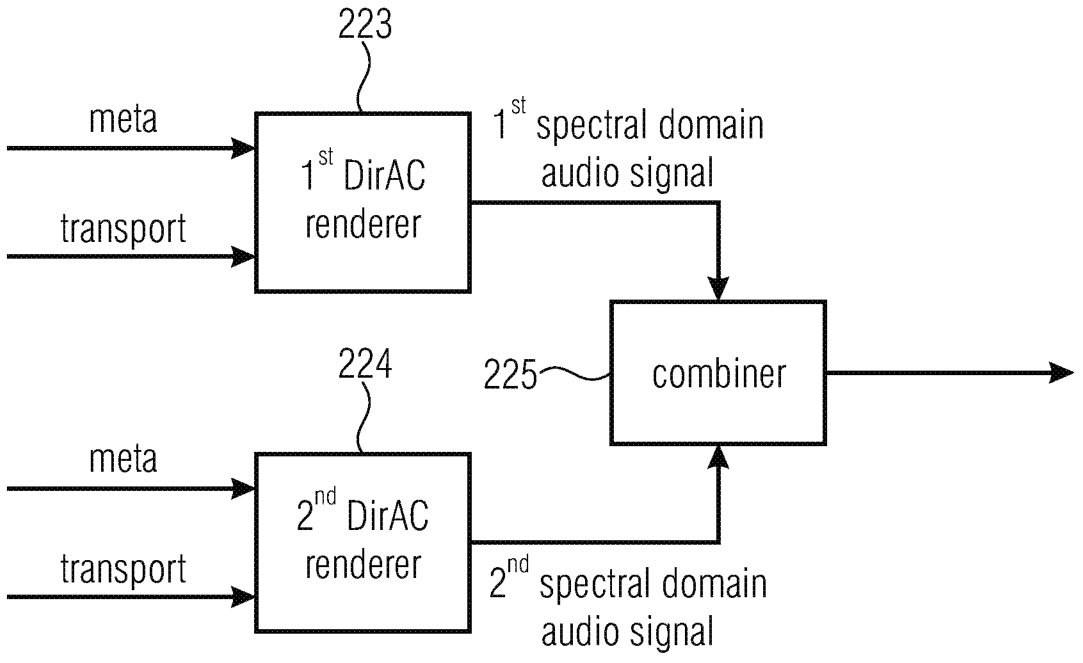
FIG. 2*c* illustrates a further implementation of the DirAC synthesizer with a combination of rendered signals.

Another alternative is illustrated in FIG. 2*c*. In this procedure, the individual DirAC descriptions are rendered by means of a first DirAC renderer 223 for the first description and a second DirAC renderer 224 for the second description and at the output of blocks 223 and 224, a first and the second spectral domain audio signal are available, and these first and second spectral domain audio signals are combined within the combiner 225 to obtain, at the output of the combiner 225, a spectral domain combination signal.

Exemplarily, the first DirAC renderer 223 and the second DirAC renderer 224 are configured to generate a stereo signal having a left channel L and a right channel R. Then, the combiner 225 is configured to combine the left channel from block 223 and the left channel from block 224 to obtain a combined left channel. Additionally, the right channel from block 223 is added with the right channel from block 224, and the result is a combined right channel at the output of block 225.

For individual channels of a multichannel signal, the analogous procedure is performed, i.e., the individual channels are individually added, so that the same channel from a DirAC renderer 223 is added to the corresponding same channel of the other DirAC renderer and so on. The same procedure is also performed for, for example, B-format or higher order Ambisonics signals. When, for example, the first DirAC renderer 223 outputs signals W, X, Y, Z signals, and the second DirAC renderer 224 outputs a similar format, then the combiner combines the two omnidirectional signals to obtain a combined omnidirectional signal W, and the same procedure is performed also for the corresponding components in order to finally obtain a X, Y and a Z combined component.

Figure 2D:
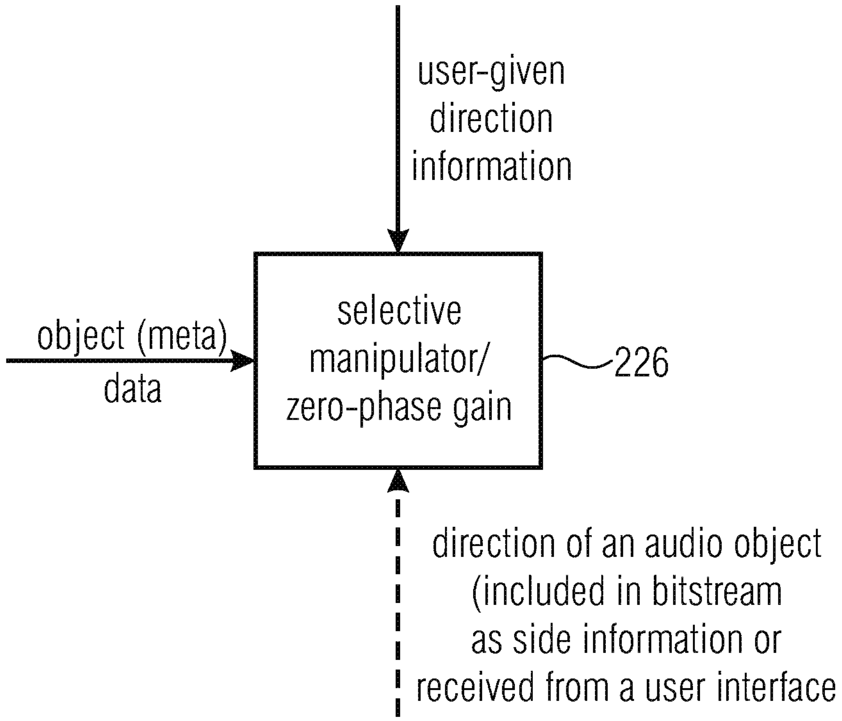
FIG. 2*d* illustrates an implementation of a selective manipulator either connected before the scene combiner 221 of FIG. 2*b* or before the combiner 225 of FIG. 2*c;*

Furthermore, as already outlined with respect to FIG. 2*a*, the input interface is configured to receive extra audio object metadata for an audio object. This audio object can already be included in the first or the second DirAC description or is separate from the first and the second DirAC description. In this case, the DirAC synthesizer 220 is configured to selectively manipulate the extra audio object metadata or object data related to this extra audio object metadata to, for example, perform a directional filtering based on the extra audio object metadata or based on user-given direction information obtained from the user interface 260. Alternatively or additionally, and as illustrated in FIG. 2*d*, the DirAC synthesizer 220 is configured for performing, in the spectral domain, a zero-phase gain function, the zero-phase gain function depending upon a direction of an audio object, wherein the direction is contained in a bit stream if directions of objects are transmitted as side information, or wherein the direction of is received from the user interface 260. The extra audio object metadata input into the interface 100 as an optional feature in FIG. 2*a* reflects the possibility to still send, for each individual object its own direction and optionally distance, diffuseness and any other relevant object attributes as part of the transmitted bit stream from the encoder to the decoder. Thus, the extra audio object metadata may related to an object already included in the first DirAC description or in the second DirAC description or is an additional object not included in the first DirAC description and in the second DirAC description already.

However, it is advantageous to have the extra audio object metadata already in a DirAC-style, i.e., a direction of arrival information and, optionally, a diffuseness information although typical audio objects have a diffusion of zero, i.e., or concentrated to their actual position resulting in a concentrated and specific direction of arrival that is constant over all frequency bands and that is, with respect to the frame rate, either static or slowly moving. Thus, since such an object has a single direction throughout all frequency bands and can be considered either static or slowly moving, the extra information may be updated less frequently than other DirAC parameters and will, therefore, incur only very low additional bitrate. Exemplarily, while the first and the second DirAC descriptions have DoA data and diffuseness data for each spectral band and for each frame, the extra audio object metadata only involves a single DoA data for all frequency bands and this data only for every second frame or, advantageously, every third, fourth, fifth or even every tenth frame in the advantageous embodiment.

Furthermore, with respect to directional filtering performed in the DirAC synthesizer 220 that is typically included within a decoder on a decoder side of an encoder/decoder system, the DirAC synthesizer can, in the FIG. 2*b* alternative, perform the directional filtering within the parameter domain before the scene combination or again perform the directional filtering subsequent to the scene combination. However, in this case, the directional filtering is applied to the combined scene rather than the individual descriptions.

Furthermore, in case an audio object is not included in the first or the second description, but is included by its own audio object metadata, the directional filtering as illustrated by the selective manipulator can be selectively applied only the extra audio object, for which the extra audio object metadata exists without effecting the first or the second DirAC description or the combined DirAC description. For the audio object itself, there either exists a separate transport channel representing the object waveform signal or the object waveforms signal is included in the downmixed transport channel.

A selective manipulation as illustrated, for example, in FIG. 2*b* may, for example, proceed in such a way that a certain direction of arrival is given by the direction of audio object introduced in FIG. 2*d* included in the bit stream as side information or received from a user interface. Then, based on the user-given direction or control information, the user may, for example, outline that, from a certain direction, the audio data is to be enhanced or is to be attenuated. Thus, the object (metadata) for the object under consideration is amplified or attenuated.

In the case of actual waveform data as the object data introduced into the selective manipulator 226 from the left in FIG. 2*d*, the audio data would be actually attenuated or enhanced depending on the control information. However, in the case of object data having, in addition to direction of arrival and optionally diffuseness or distance, a further energy information, then the energy information for the object would be reduced in the case of a useful attenuation for the object or the energy information would be increased in the case of a useful amplification of the object data.

Thus, the directional filtering is based upon a short-time spectral attenuation technique, and it is performed it the spectral domain by a zero-phase gain function which depends upon the direction of the objects. The direction can be contained in the bit stream if directions of objects were transmitted as side-information. Otherwise, the direction could also be given interactively by the user. Naturally, the same procedure cannot only be applied to the individual object given and reflected by the extra audio object metadata typically provided by DoA data for all frequency bands and DoA data with a low update ratio with respect to the frame rate and also given by the energy information for the object, but the directional filtering can also be applied to the first DirAC description independent from the second DirAC description or vice versa or can be also applied to the combined DirAC description as the case may be.

Furthermore, it is to be noted that the feature with respect to the extra audio object data can also be applied in the first aspect of the present invention illustrated with respect to FIGS. 1*a* to 1*f*. Then, the input interface 100 of FIG. 1*a* additionally receives the extra audio object data as discussed with respect to FIG. 2*a*, and the format combiner may be implemented as the DirAC synthesizer in the spectral domain 220 controlled by a user interface 260.

Furthermore, the second aspect of the present invention as illustrated in FIG. 2 is different from the first aspect in that the input interface receives already two DirAC descriptions, i.e., descriptions of a sound field that are in the same format and, therefore, for the second aspect, the format converter 120 of the first aspect is not necessarily required.

On the other hand, when the input into the format combiner 140 of FIG. 1*a* consists of two DirAC descriptions, then the format combiner 140 can be implemented as discussed with respect to the second aspect illustrated in FIG. 2*a*, or, alternatively, the FIG. 2*a* devices 220, 240, can be implemented as discussed with respect to the format combiner 140 of FIG. 1*a* of the first aspect.

Figure 3A:
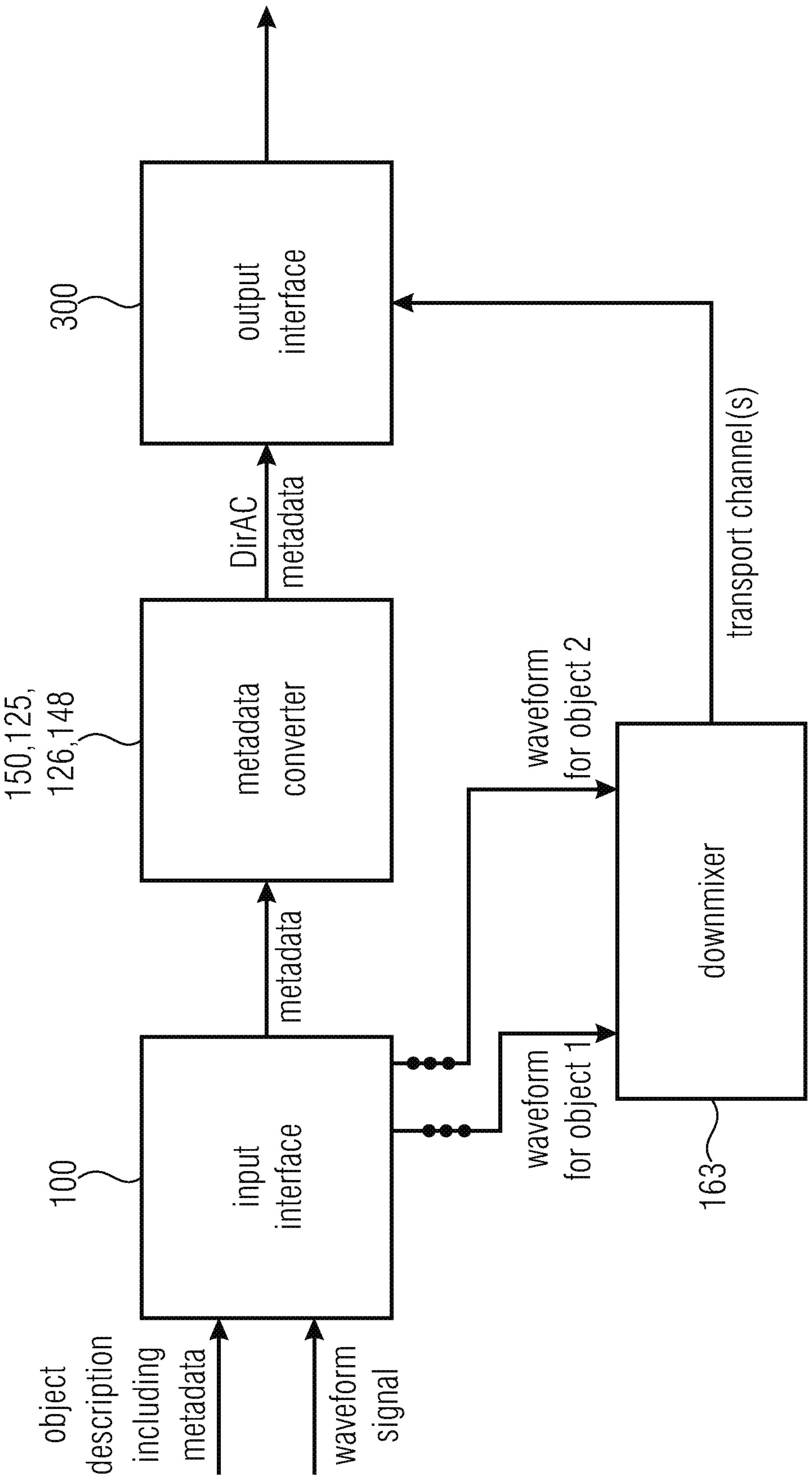
FIG. 3*a* is an implementation of an apparatus or method for performing and audio data conversion in accordance with a third aspect of the present invention.

FIG. 3*a* illustrates an audio data converter comprising an input interface 100 for receiving an object description of an audio object having audio object metadata. Furthermore, the input interface 100 is followed by a metadata converter 150 also corresponding to the metadata converters 125, 126 discussed with respect to the first aspect of the present invention for converting the audio object metadata into DirAC metadata. The output of the FIG. 3*a* audio converter is constituted by an output interface 300 for transmitting or storing the DirAC metadata. The input interface 100 may, additionally receive a waveform signal as illustrated by the second arrow input into the interface 100. Furthermore, the output interface 300 may be implemented to introduce, typically an encoded representation of the waveform signal into the output signal output by block 300. If the audio data converter is configured to only convert a single object description including metadata, then the output interface 300 also provides a DirAC description of this single audio object together with the typically encoded waveform signal as the DirAC transport channel.

Figure 3B:
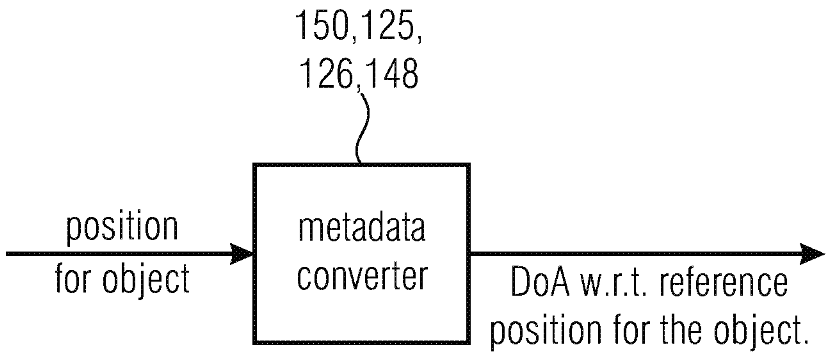
FIG. 3*b* is an implementation of the metadata converter also illustrated in FIG. 1*f;*
Figure 3C:
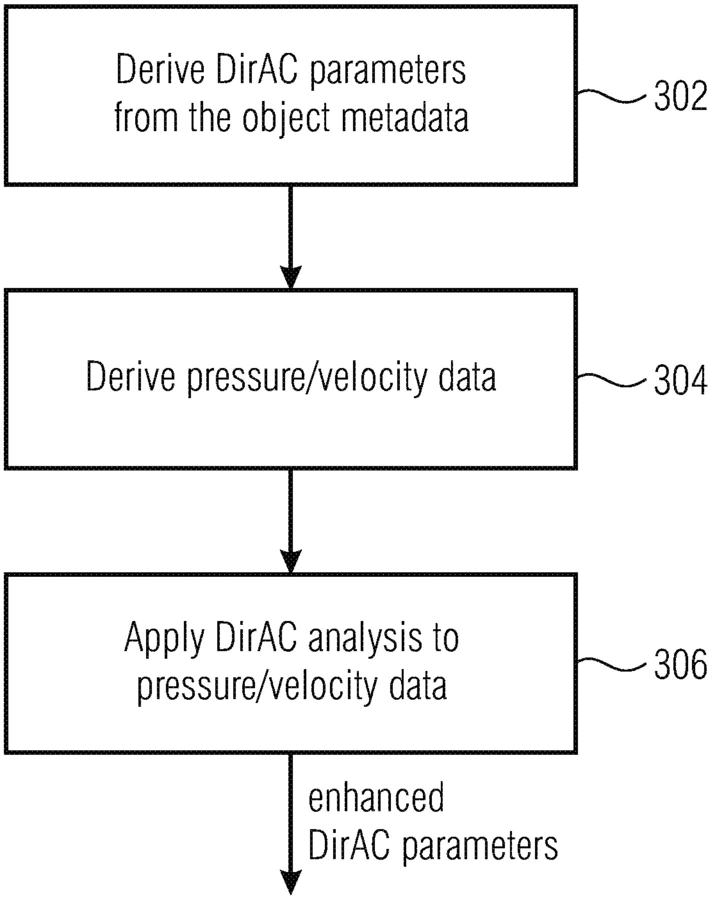
FIG. 3*c* is a flowchart for performing a further implementation of an audio data conversion via the pressure/velocity domain.
Figure 3D:
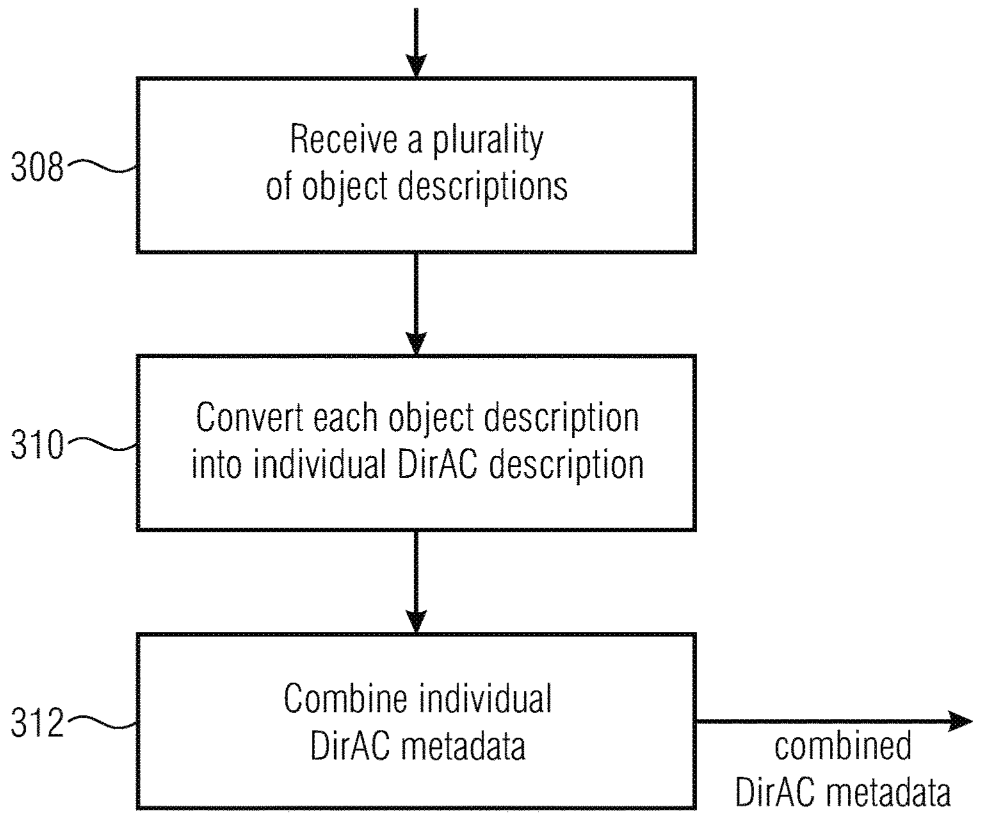
FIG. 3*d* illustrates a flowchart for performing a combination within the DirAC domain.
Figure 3E:
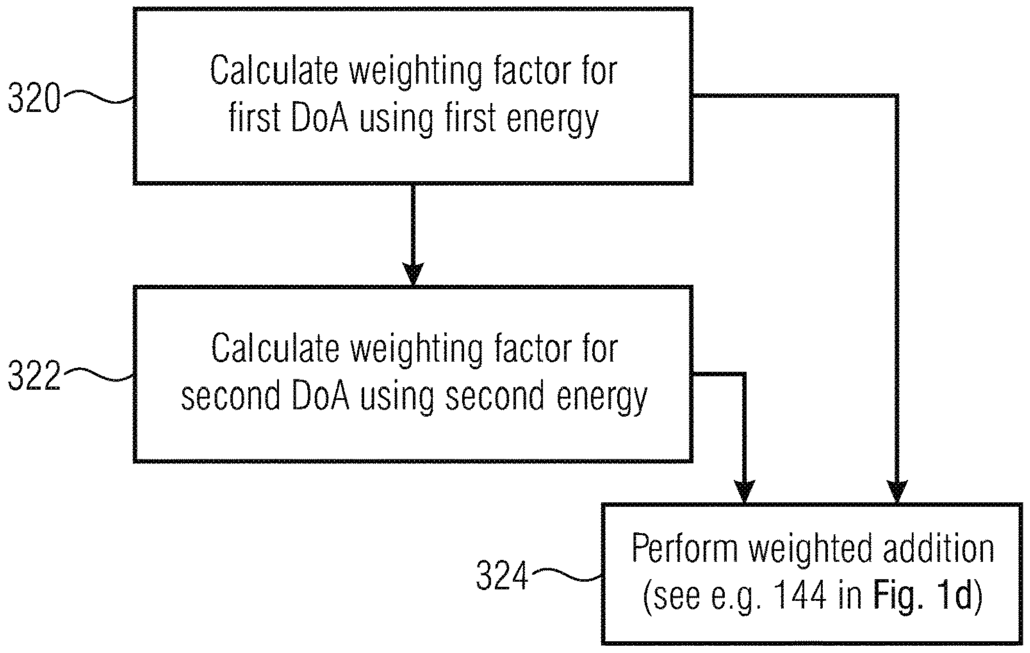
FIG. 3*e* illustrates an implementation for combining different DirAC descriptions, for example as illustrated in FIG. 1*d* with respect to the first aspect of the present invention.

Particularly, the audio object metadata has an object position, and the DirAC metadata has a direction of arrival with respect to a reference position derived from the object position. Particularly, the metadata converter 150, 125, 126 is configured to convert DirAC parameters derived from the object data format into pressure/velocity data, and the metadata converter is configured to apply a DirAC analysis to this pressure/velocity data as, for example, illustrated by the flowchart of FIG. 3*c* consisting of block 302, 304, 306. For this purpose, the DirAC parameters output by block 306 have a better quality than the DirAC parameters derived from the object metadata obtained by block 302, i.e., are enhanced DirAC parameters. FIG. 3*b* illustrates the conversion of a position for an object into the direction of arrival with respect to a reference position for the specific object.

Figure 3F:
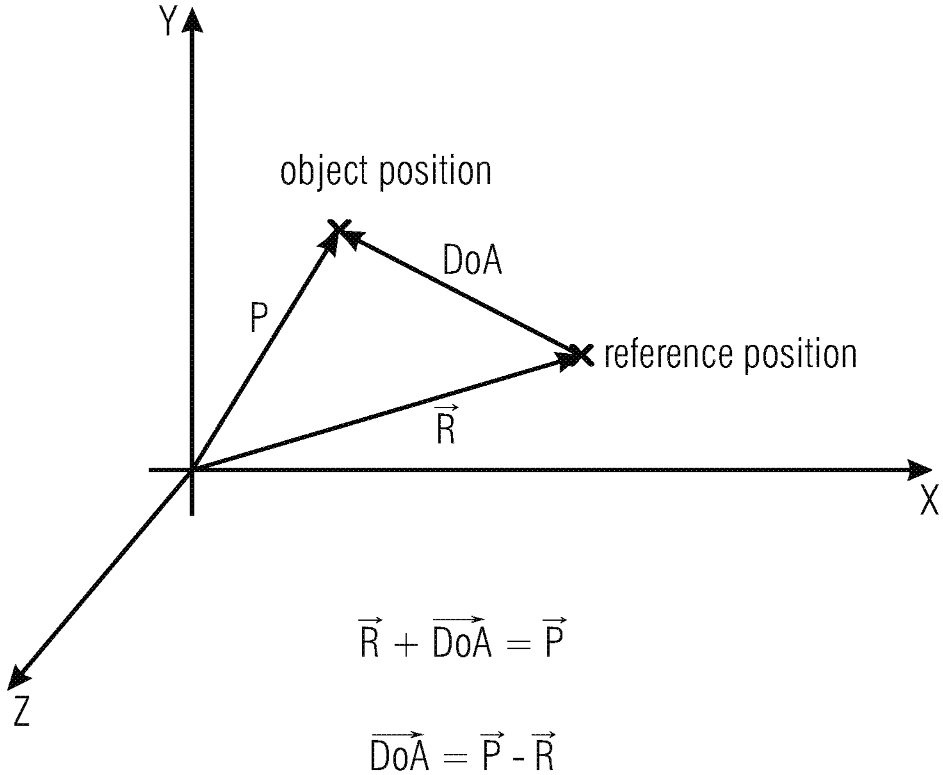
FIG. 3*f* illustrates the conversion of an object position data into a DirAC parametric representation.

FIG. 3*f* illustrates a schematic diagram for explaining the functionality of the metadata converter 150. The metadata converter 150 receives the position of the object indicated by vector P in a coordinate system. Furthermore, the reference position, to which the DirAC metadata are to be related is given by vector R in the same coordinate system. Thus, the direction of arrival vector DoA extends from the tip of vector R to the tip of vector B. Thus, the actual DoA vector is obtained by subtracting the reference position R vector from the object position P vector.

In order to have a normalized DoA information indicated by the vector DoA, the vector difference is divided by the magnitude or length of the vector DoA. Furthermore, and should this be useful and intended, the length of the DoA vector can also be included into the metadata generated by the metadata converter 150 so that, additionally, the distance of the object from the reference point is also included in the metadata so that a selective manipulation of this object can also be performed based on the distance of the object from the reference position. Particularly, the extract direction block 148 of FIG. 1*f* may also operate as discussed with respect to FIG. 3*f*, although other alternatives for calculating the DoA information and, optionally, the distance information can be applied as well. Furthermore, as already discussed with respect to FIG. 3*a*, blocks 125 and 126 illustrated in FIG. 1*c* or 1*d* may operate in the similar way as discussed with respect to FIG. 3*f*.

Furthermore, the FIG. 3*a* device may be configured to receive a plurality of audio object descriptions, and the metadata converter is configured to convert each metadata description directly into a DirAC description and, then, the metadata converter is configured to combine the individual DirAC metadata descriptions to obtain a combined DirAC description as the DirAC metadata illustrated in FIG. 3*a*. In one embodiment, the combination is performed by calculating 320 a weighting factor for a first direction of arrival using a first energy and by calculating 322 a weighting factor for a second direction of arrival using a second energy, where the direction of arrival is processed by blocks 320, 332 related to the same time/frequency bin. Then, in block 324, a weighted addition is performed as also discussed with respect to item 144 in FIG. 1*d*. Thus, the procedure illustrated in FIG. 3*a* represents an embodiment of the first alternative FIG. 1*d*.

However, with respect to the second alternative, the procedure would be that all diffuseness are set to zero or to a small value and, for a time/frequency bin, all different direction of arrival values that are given for this time/frequency bin are considered and the largest direction of arrival value is selected to be the combined direction of arrival value for this time/frequency bin. In other embodiments, one could also select the second to largest value provided that the energy information for these two direction of arrival values are not so different. The direction of arrival value is selected whose energy is either the largest energy among the energies from the different contribution for this time frequency bin or the second or the third highest energy.

Thus, the third aspect as described with respect to FIGS. 3*a* to 3*f* are different from the first aspect in that the third aspect is also useful for the conversion of a single object description into a DirAC metadata. Alternatively, the input interface 100 may receive several object descriptions that are in the same object/metadata format. Thus, any format converter as discussed with respect to the first aspect in FIG. 1*a* is not required. Thus, the FIG. 3*a* embodiment may be useful in the context of receiving two different object descriptions using different object waveform signals and different object metadata as the first scene description and the second description as input into the format combiner 140, and the output of the metadata converter 150, 125, 126 or 148 may be a DirAC representation with DirAC metadata and, therefore, the DirAC analyzer 180 of FIG. 1 is also not required. However, the other elements with respect to the transport channel generator 160 corresponding to the downmixer 163 of FIG. 3*a* can be used in the context of the third aspect as well as the transport channel encoder 170, the metadata encoder 190 and, in this context, the output interface 300 of FIG. 3*a* corresponds to the output interface 200 of FIG. 1*a*. Hence, all corresponding descriptions given with respect to the first aspect also apply to the third aspect as well.

FIGS. 4*a*, 4*b* illustrate a fourth aspect of the present invention in the context of an apparatus for performing a synthesis of audio data. Particularly, the apparatus has an input interface 100 for receiving a DirAC description of an audio scene having DirAC metadata and additionally for receiving an object signal having object metadata. This audio scene encoder illustrated in FIG. 4*b* additionally comprises the metadata generator 400 for generating a combined metadata description comprising the DirAC metadata on the one hand and the object metadata on the other hand. The DirAC metadata comprises the direction of arrival for individual time/frequency tiles and the object metadata comprises a direction or additionally a distance or a diffuseness of an individual object.

Particularly, the input interface 100 is configured to receive, additionally, a transport signal associated with the DirAC description of the audio scene as illustrated in FIG. 4*b*, and the input interface is additionally configured for receiving an object waveform signal associated with the object signal. Therefore, the scene encoder further comprises a transport signal encoder for encoding the transport signal and the object waveform signal, and the transport encoder 170 may correspond to the encoder 170 of FIG. 1*a*.

Particularly, the metadata generator 140 that generates the combined metadata may be configured as discussed with respect to the first aspect, the second aspect or the third aspect. And, in an embodiment, the metadata generator 400 is configured to generate, for the object metadata, a single broadband direction per time, i.e., for a certain time frame, and the metadata generator is configured to refresh the single broadband direction per time less frequently than the DirAC metadata.

The procedure discussed with respect to FIG. 4*b* allows to have combined metadata that has metadata for a full DirAC description and that has, in addition, metadata for an additional audio object, but in the DirAC format so that a very useful DirAC rendering can be performed by, at the same time, a selective directional filtering or modification as already discussed with respect to the second aspect can be performed.

Thus, the fourth aspect of the present invention and, particularly, the metadata generator 400 represents a specific format converter where the common format is the DirAC format, and the input is a DirAC description for the first scene in the first format discussed with respect to FIG. 1*a* and the second scene is a single or a combined such as SAOC object signal. Hence, the output of the format converter 120 represents the output of the metadata generator 400 but, in contrast to an actual specific combination of the metadata by one of the two alternatives, for example, as discussed with respect to FIG. 1*d*, the object metadata is included in the output signal, i.e., the "combined metadata" separate from the metadata for the DirAC description to allow a selective modification for the object data.

Thus, the "direction/distance/diffuseness" indicated at item 2 at the right hand side of FIG. 4*a* corresponds to the extra audio object metadata input into the input interface 100 of FIG. 2*a*, but, in the embodiment of FIG. 4*a*, for a single DirAC description only. Thus, in a sense, one could say that FIG. 2*a* represents a decoder-side implementation of the encoder illustrated in FIG. 4*a*, 4*b* with the provision that the decoder side of FIG. 2*a* device receives only a single DirAC description and the object metadata generated by the metadata generator 400 within the same bit stream as the "extra audio object metadata".

Thus, a completely different modification of the extra object data can be performed when the encoded transport signal has a separate representation of the object waveform signal separate from the DirAC transport stream. And, however, the transport encoder 170 downmixes both data, i.e., the transport channel for the DirAC description and the waveform signal from the object, then the separation will be less perfect, but by means of additional object energy information, even a separation from a combined downmix channel and a selective modification of the object with respect to the DirAC description is available.

FIGS. 5*a* to 5*d* represent a further of fifth aspect of the invention in the context of an apparatus for performing a synthesis of audio data. To this end, an input interface 100 is provided for receiving a DirAC description of one or more audio objects and/or a DirAC description of a multi-channel signal and/or a DirAC description of a first order Ambisonics signal and/or a higher order Ambisonics signal, wherein the DirAC description comprises position information of the one or more objects or a side information for the first order Ambisonics signals or the high order Ambisonics signals or a position information for the multi-channel signal as side information or from a user interface.

Particularly, a manipulator 500 is configured for manipulating the DirAC description of the one or more audio objects, the DirAC description of the multi-channel signal, the DirAC description of the first order Ambisonics signals or the DirAC description of the high order Ambisonics signals to obtain a manipulated DirAC description. In order to synthesize this manipulated DirAC description, a DirAC synthesizer 220, 240 is configured for synthesizing this manipulated DirAC description to obtain synthesized audio data.

Figure 5A:
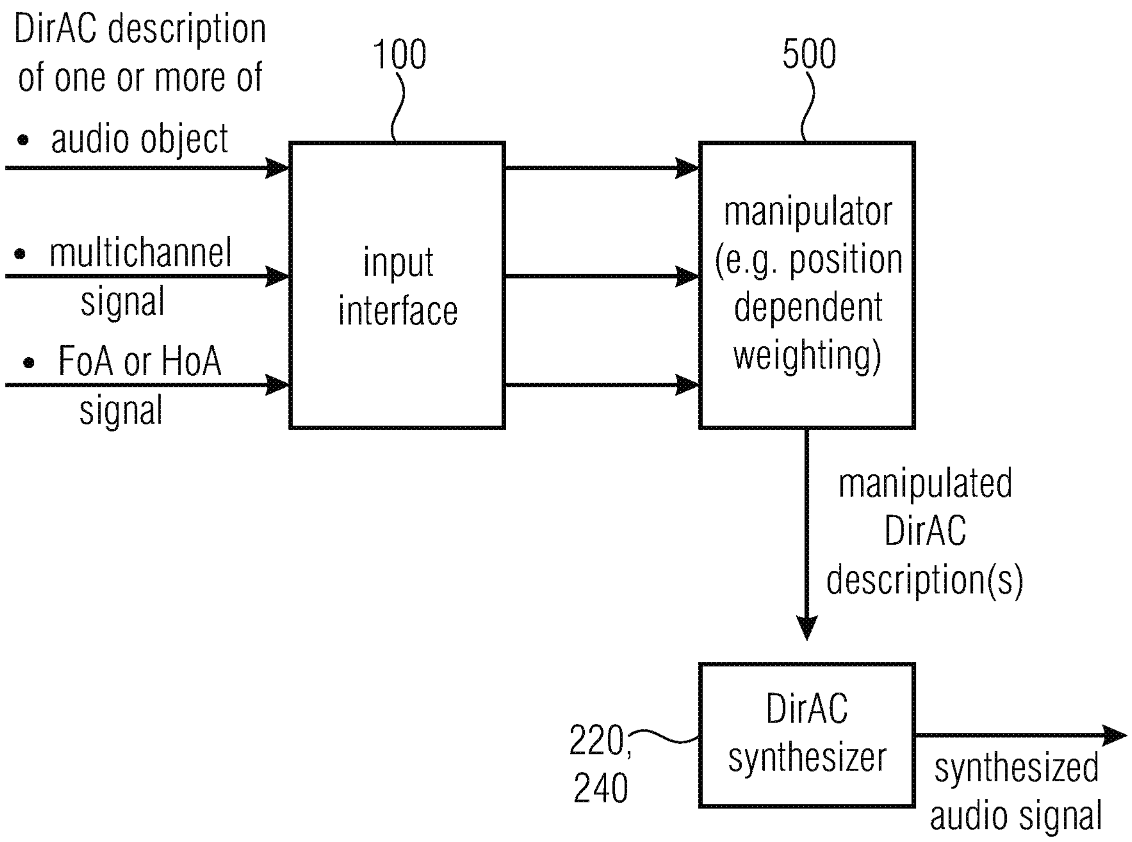
FIG. 5*a* illustrates an implementation of an apparatus for performing a synthesis of audio data or a corresponding method in accordance with a fifth aspect of the present invention.
Figure 5B:
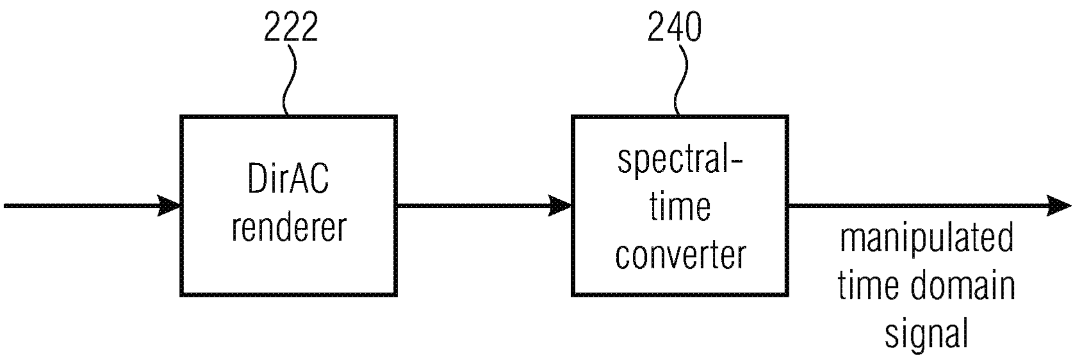
FIG. 5*b* illustrates an implementation of the DirAC synthesizer of FIG. 5*a;*
Figure 5C:
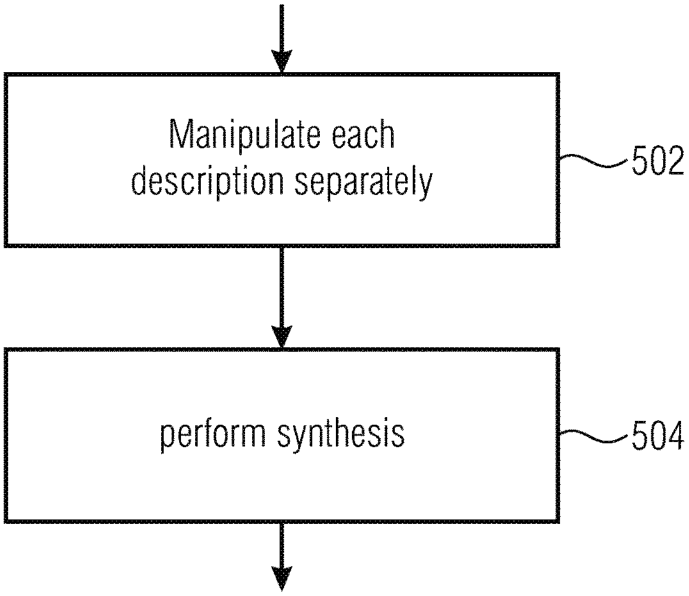
FIG. 5*c* illustrates a further alternative of the procedure of the manipulator of FIG. 5*a;*

In an embodiment, the DirAC synthesizer 220, 240 comprises a DirAC renderer 222 as illustrated in FIG. 5*b* and the subsequently connected spectral-time converter 240 that outputs the manipulated time domain signal. Particularly, the manipulator 500 is configured to perform a position-dependent weighting operation prior to DirAC rendering.

Figure 5D:
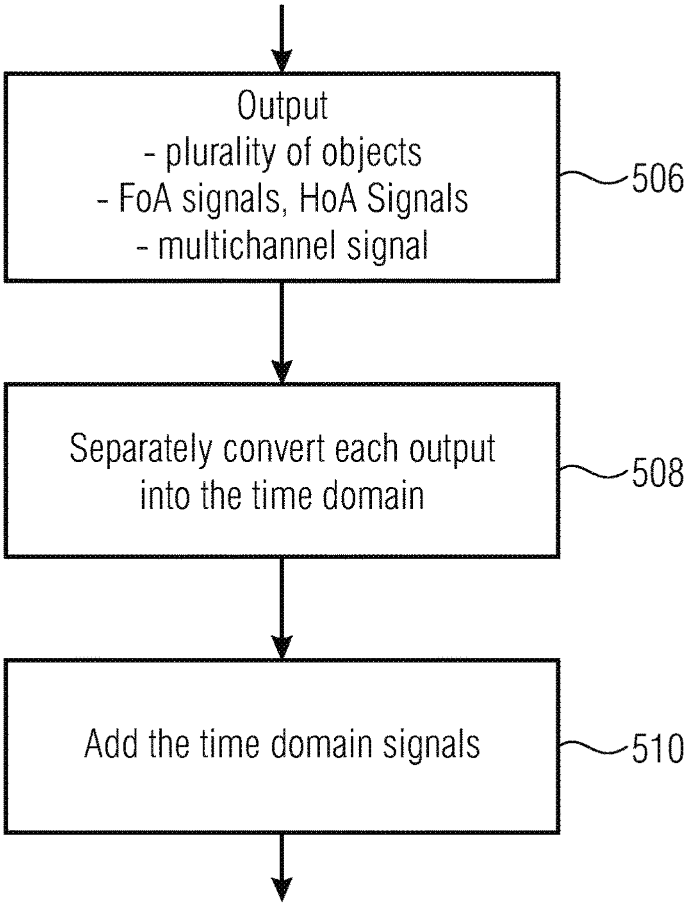
FIG. 5*d* illustrates a further procedure for the implementation of the FIG. 5*a* manipulator.

Particularly, when the DirAC synthesizer is configured to output a plurality of objects of a first order Ambisonics signals or a high order Ambisonics signal or a multi-channel signal, the DirAC synthesizer is configured to use a separate spectral-time converter for each object or each component of the first or the high order Ambisonics signals or for each channel of the multichannel signal as illustrated in FIG. 5*d* at blocks 506, 508. As outlined in block 510 then the output of the corresponding separate conversions are added together provided that all the signals are in a common format, i.e., in compatible format.

Therefore, in case of the input interface 100 of FIG. 5*a*, receiving more than one, i.e., two or three representations, each representation could be manipulated separately as illustrated in block 502 in the parameter domain as already discussed with respect to FIG. 2*b* or 2*c*, and, then, a synthesis could be performed as outlined in block 504 for each manipulated description, and the synthesis could then be added in the time domain as discussed with respect to block 510 in FIG. 5*d*. Alternatively, the result of the individual DirAC synthesis procedures in the spectral domain could already be added in the spectral domain and then a single time domain conversion could be used as well. Particularly, the manipulator 500 may be implemented as the manipulator discussed with respect to FIG. 2*d* or discussed with respect to any other aspect before.

Hence, the fifth aspect of the present invention provides a significant feature with respect to the fact, when individual DirAC descriptions of very different sound signals are input, and when a certain manipulation of the individual descriptions is performed as discussed with respect to block 500 of FIG. 5*a*, where an input into the manipulator 500 may be a DirAC description of any format, including only a single format, while the second aspect was concentrating on the reception of at least two different DirAC descriptions or where the fourth aspect, for example, was related to the reception of a DirAC description on the one hand and an object signal description on the other hand.

Figure 6:
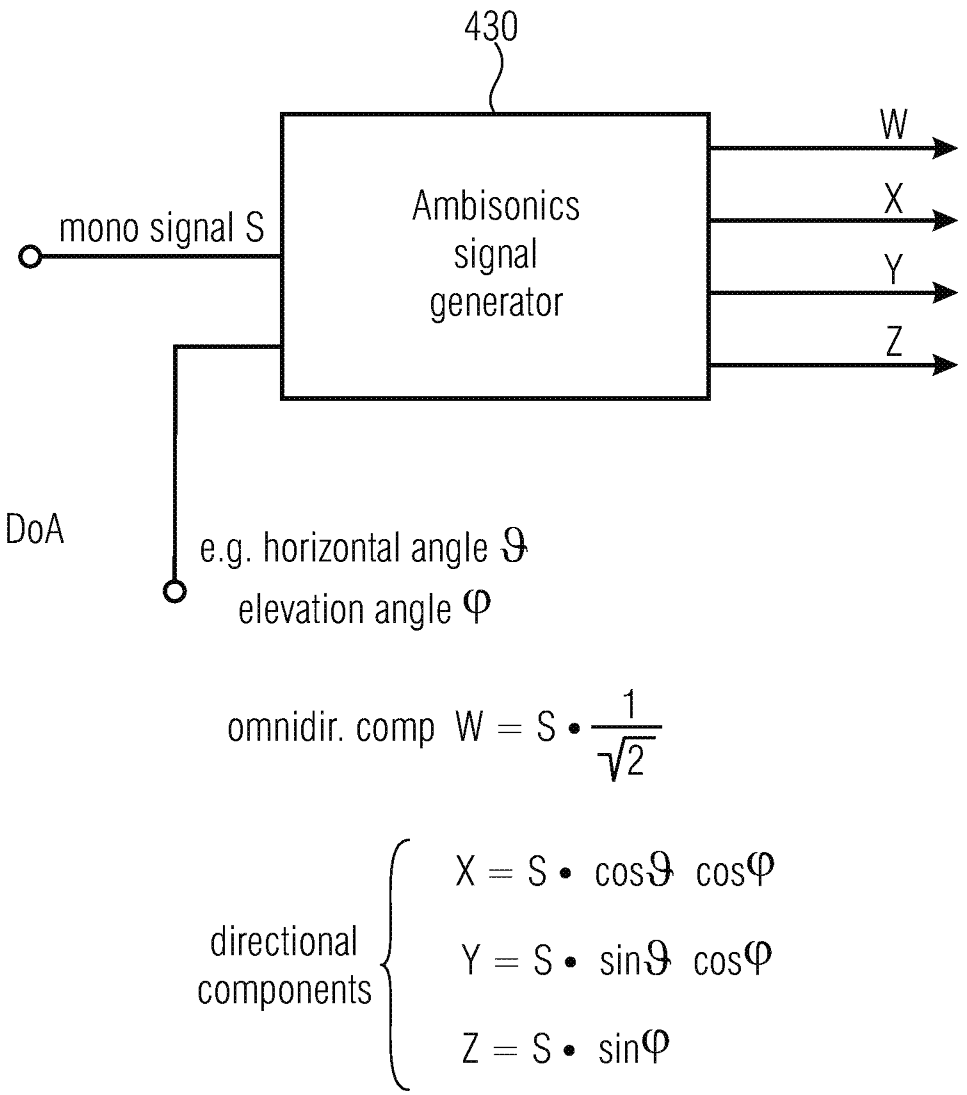
FIG. 6 illustrates an audio signal converter for generating, from a mono-signal and a direction of arrival information, i.e., from an exemplary DirAC description, where the diffuseness is, for example, set to zero, a B-format representation comprising an omnidirectional component and directional components in X, Y and Z directions.

Subsequently, reference is made to FIG. 6. FIG. 6 illustrates another implementation for performing a synthesis different from the DirAC synthesizer. When, for example, a sound field analyzer generates, for each source signal, a separate mono signal S and an original direction of arrival and when, depending on the translation information, a new direction of arrival is calculated, then the Ambisonics signal generator 430 of FIG. 6, for example, would be used to generate a sound field description for the sound source signal, i.e., the mono signal S but for the new direction of arrival (DoA) data consisting of a horizontal angle θ or an elevation angle θ and an azimuth angle φ. Then, a procedure performed by the sound field calculator 420 of FIG. 6 would be to generate, for example, a first-order Ambisonics sound field representation for each sound source with the new direction of arrival and, then, a further modification per sound source could be performed using a scaling factor depending on the distance of the sound field to the new reference location and, then, all the sound fields from the individual sources could superposed to each other to finally obtain the modified sound field, once again, in, for example, an Ambisonics representation related to a certain new reference location.

When one interprets that each time/frequency bin processed by the DirAC analyzer 422 represents a certain (bandwidth limited) sound source, then the Ambisonics signal generator 430 could be used, instead of the DirAC synthesizer 425, to generate, for each time/frequency bin, a full Ambisonics representation using the downmix signal or pressure signal or omnidirectional component for this time/frequency bin as the "mono signal S" of FIG. 6. Then, an individual frequency-time conversion in frequency-time converter 426 for each of the W, X, Y, Z component would then result in a sound field description different from what is illustrated in FIG. 6.

Figure 7A:
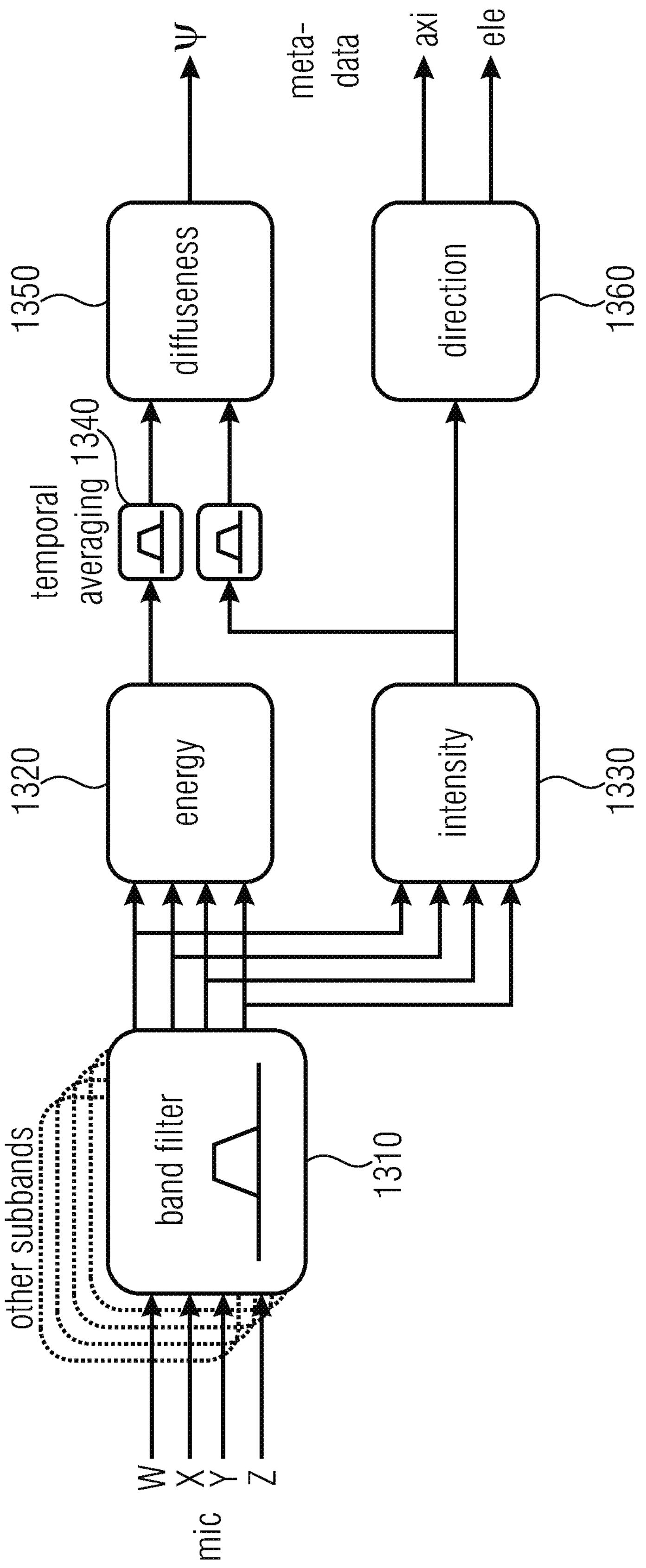
Fig. 7a (PRIOR ART)
FIG. 7*a* illustrates an implementation of a DirAC analysis of a B-Format microphone signal.

Subsequently, further explanations regarding a DirAC analysis and a DirAC synthesis are given as known in the art. FIG. 7*a* illustrates a DirAC analyzer as originally disclosed, for example, in the reference "Directional Audio Coding" from IWPASH of 2009. The DirAC analyzer comprises a bank of band filters 1310, an energy analyzer 1320, an intensity analyzer 1330, a temporal averaging block 1340 and a diffuseness calculator 1350 and the direction calculator 1360. In DirAC, both analysis and synthesis are performed in the frequency domain. There are several methods for dividing the sound into frequency bands, within distinct properties each. The most commonly used frequency transforms include short time Fourier transform (STFT), and Quadrature mirror filter bank (QMF). In addition to these, there is a full liberty to design a filter bank with arbitrary filters that are optimized to any specific purposes. The target of directional analysis is to estimate at each frequency band the direction of arrival of sound, together with an estimate if the sound is arriving from one or multiple directions at the same time. In principle, this can be performed with a number of techniques, however, the energetic analysis of sound field has been found to be suitable, which is illustrated in FIG. 7*a*. The energetic analysis can be performed, when the pressure signal and velocity signals in one, two or three dimensions are captured from a single position. In first-order B-format signals, the omnidirectional signal is called W-signal, which has been scaled down by the square root of two. The sound pressure can be estimated as $S=\sqrt{2}*W$, expressed in the STFT domain.

The X-, Y- and Z channels have the directional pattern of a dipole directed along the Cartesian axis, which form together a vector U=[X, Y, Z]. The vector estimates the sound field velocity vector, and is also expressed in STFT domain. The energy E of the sound field is computed. The capturing of B-format signals can be obtained with either coincident positioning of directional microphones, or with a closely-spaced set of omnidirectional microphones. In some applications, the microphone signals may be formed in a computational domain, i.e., simulated. The direction of sound is defined to be the opposite direction of the intensity vector I. The direction is denoted as corresponding angular azimuth and elevation values in the transmitted metadata. The diffuseness of sound field is also computed using an expectation operator of the intensity vector and the energy. The outcome of this equation is a real-valued number between zero and one, characterizing if the sound energy is arriving from a single direction (diffuseness is zero), or from all directions (diffuseness is one). This procedure is appropriate in the case when the full 3D or less dimensional velocity information is available.

Figure 7B:
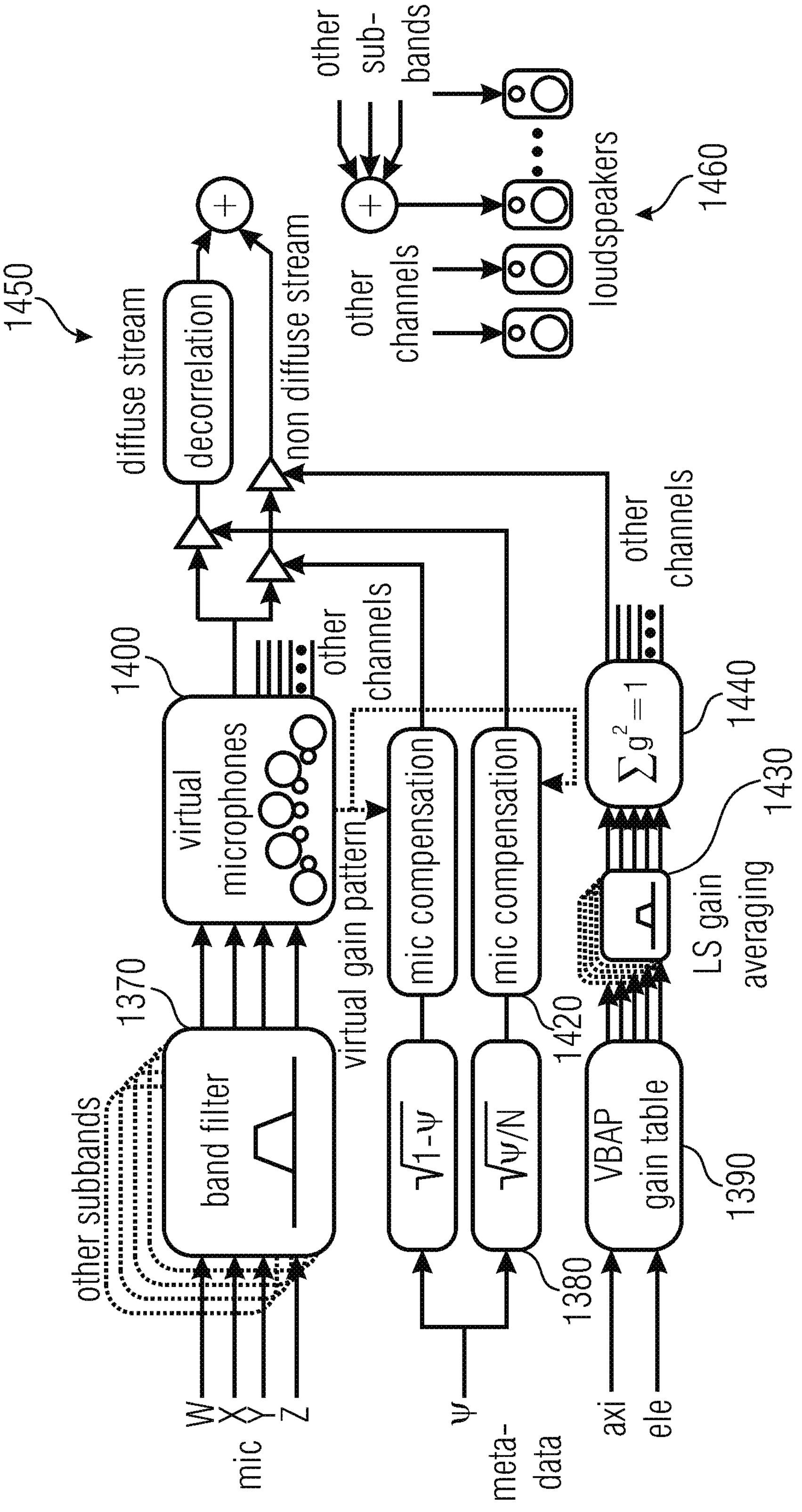
Fig. 7b (PRIOR ART)
FIG. 7*b* illustrates an implementation of a DirAC synthesis in accordance with a known procedure.

FIG. 7*b* illustrates a DirAC synthesis, once again having a bank of band filters 1370, a virtual microphone block 1400, a direct/diffuse synthesizer block 1450, and a certain loudspeaker setup or a virtual intended loudspeaker setup 1460. Additionally, a diffuseness-gain transformer 1380, a vector based amplitude panning (VBAP) gain table block 1390, a microphone compensation block 1420, a loudspeaker gain averaging block 1430 and a distributer 1440 for other channels is used. In this DirAC synthesis with loudspeakers, the high quality version of DirAC synthesis shown in FIG. 7*b* receives all B-format signals, for which a virtual microphone signal is computed for each loudspeaker direction of the loudspeaker setup 1460. The utilized directional pattern is typically a dipole. The virtual microphone signals are then modified in non-linear fashion, depending on the metadata. The low bitrate version of DirAC is not shown in FIG. 7*b*, however, in this situation, only one channel of audio is transmitted as illustrated in FIG. 6. The difference in processing is that all virtual microphone signals would be replaced by the single channel of audio received. The virtual microphone signals are divided into two streams: the diffuse and the non-diffuse streams, which are processed separately.

The non-diffuse sound is reproduced as point sources by using vector base amplitude panning (VBAP). In panning, a monophonic sound signal is applied to a subset of loudspeakers after multiplication with loudspeaker-specific gain factors. The gain factors are computed using the information of a loudspeaker setup, and specified panning direction. In the low-bit-rate version, the input signal is simply panned to the directions implied by the metadata. In the high-quality version, each virtual microphone signal is multiplied with the corresponding gain factor, which produces the same effect with panning, however it is less prone to any nonlinear artifacts.

In many cases, the directional metadata is subject to abrupt temporal changes. To avoid artifacts, the gain factors for loudspeakers computed with VBAP are smoothed by temporal integration with frequency-dependent time constants equaling to about 50 cycle periods at each band. This effectively removes the artifacts, however, the changes in direction are not perceived to be slower than without averaging in most of the cases. The aim of the synthesis of the diffuse sound is to create perception of sound that surrounds the listener. In the low-bit-rate version, the diffuse stream is reproduced by decorrelating the input signal and reproducing it from every loudspeaker. In the high-quality version, the virtual microphone signals of diffuse stream are already incoherent in some degree, and they need to be decorrelated only mildly. This approach provides better spatial quality for surround reverberation and ambient sound than the low bit-rate version. For the DirAC synthesis with headphones, DirAC is formulated with a certain amount of virtual loudspeakers around the listener for the non-diffuse stream and a certain number of loudspeakers for the diffuse steam. The virtual loudspeakers are implemented as convolution of input signals with a measured head-related transfer functions (HRTFs).

Subsequently, a further general relation with respect to the different aspects and, particularly, with respect to further implementations of the first aspect as discussed with respect to FIG. 1*a* is given. Generally, the present invention refers to the combination of different scenes in different formats using a common format, where the common format may, for example, be the B-format domain, the pressure/velocity domain or the metadata domain as discussed, for example, in items 120, 140 of FIG. 1*a*.

When the combination is not done directly in the DirAC common format, then a DirAC analysis 802 is performed in one alternative before the transmission in the encoder as discussed before with respect to item 180 of FIG. 1*a*.

Then, subsequent to the DirAC analysis, the result is encoded as discussed before with respect to the encoder 170 and the metadata encoder 190 and the encoded result is transmitted via the encoded output signal generated by the output interface 200. However, in a further alternative, the result could be directly rendered by a FIG. 1*a* device when the output of block 160 of FIG. 1*a* and the output of block 180 of FIG. 1*a* is forwarded to a DirAC renderer. Thus, the FIG. 1*a* device would not be a specific encoder device but would be an analyzer and a corresponding renderer.

Figure 8:
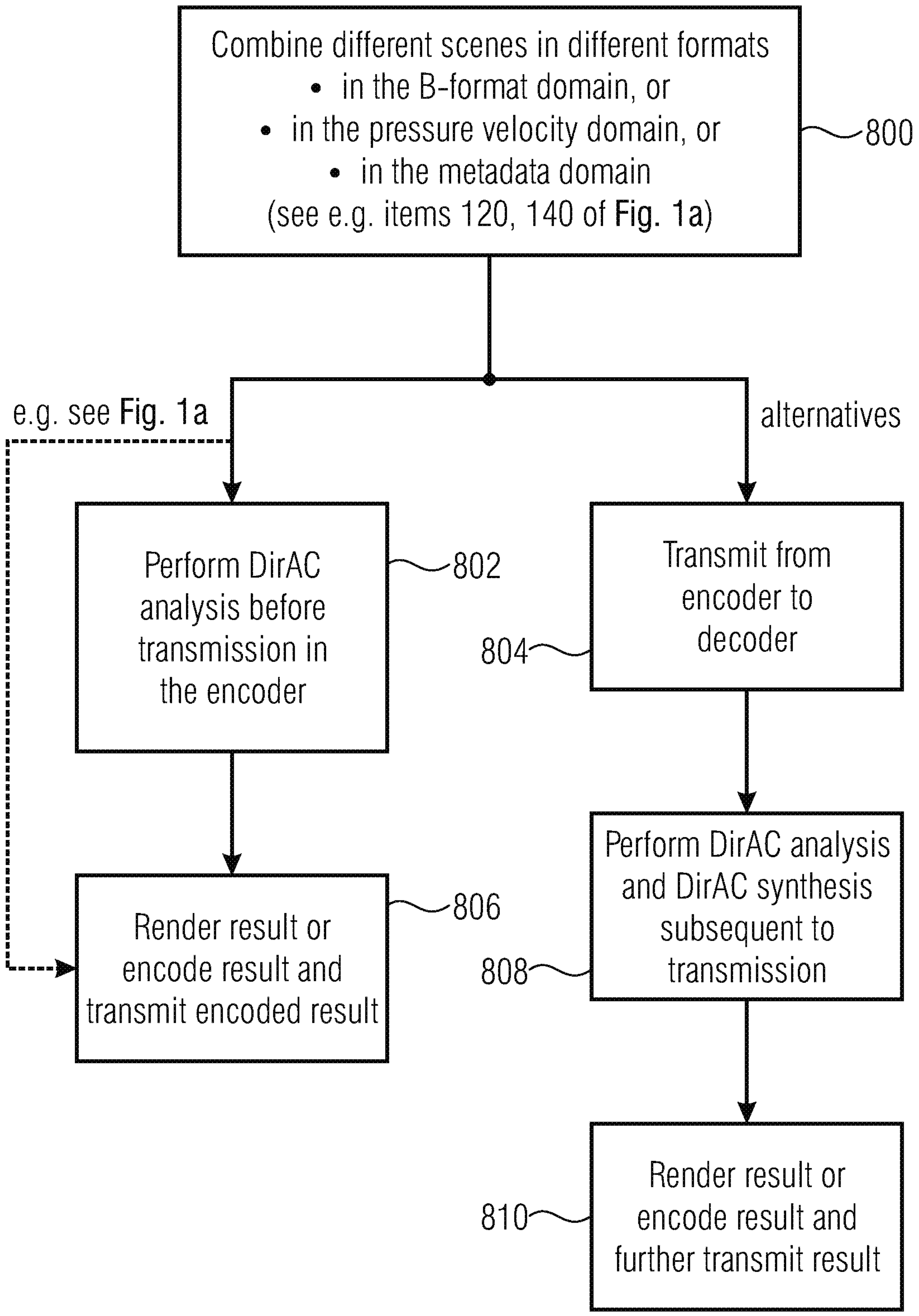
FIG. 8 illustrates a flowchart for illustrating further embodiments of, particularly, the FIG. 1*a* embodiment.
Figure 9:
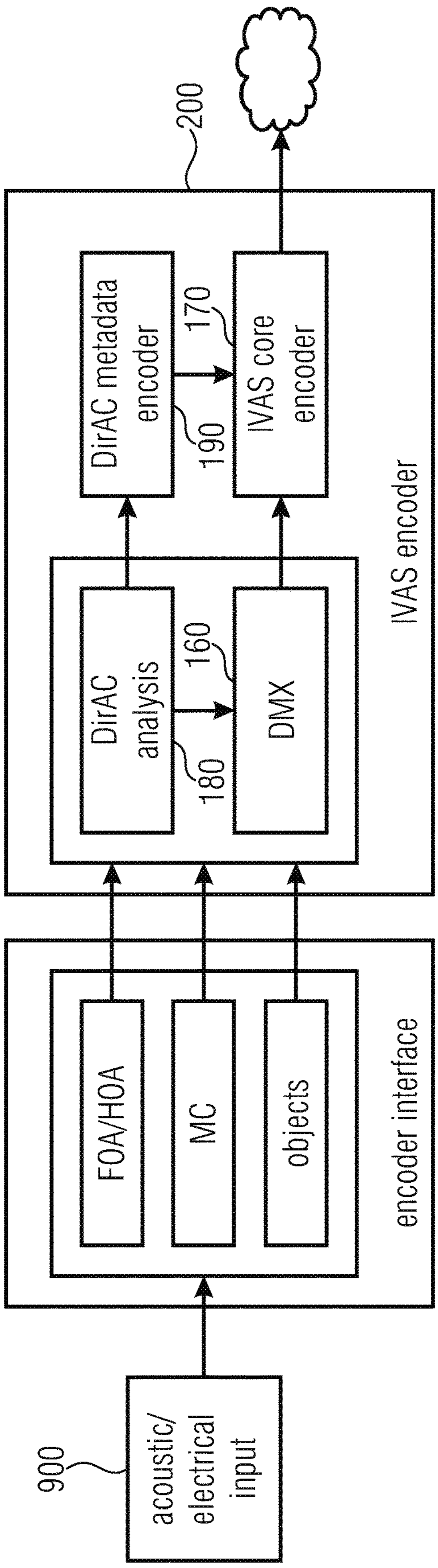
FIG. 9 is the encoder side of the DirAC-based spatial audio coding supporting different audio formats.
Figure 10:
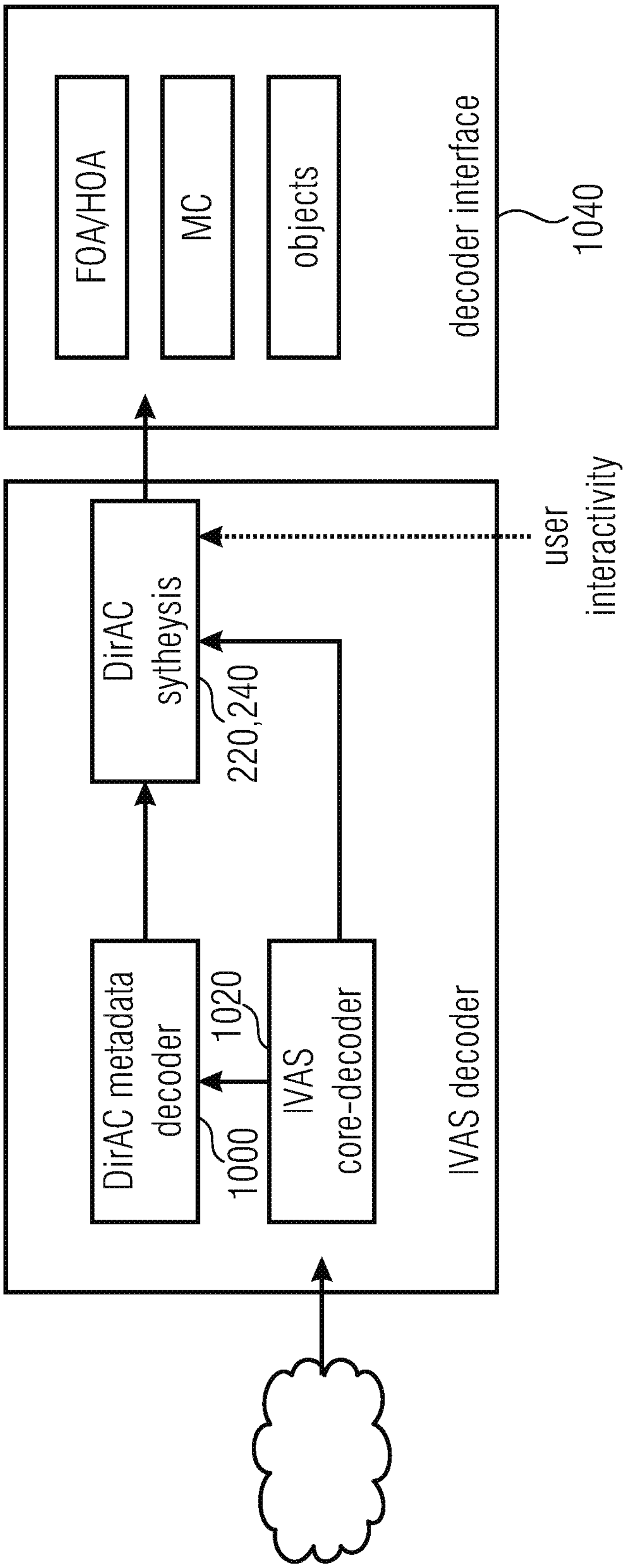
FIG. 10 is a decoder of the DirAC-based spatial audio coding delivering different audio formats.

A further alternative is illustrated in the right branch of FIG. 8, where a transmission from the encoder to the decoder is performed and, as illustrated in block 804, the DirAC analysis and the DirAC synthesis are performed subsequent to the transmission, i.e., at a decoder-side. This procedure would be the case, when the alternative of FIG. 1*a* is used, i.e., that the encoded output signal is a B-format signal without spatial metadata. Subsequent to block 808, the result could be rendered for replay or, alternatively, the result could even be encoded and again transmitted. Thus, it becomes clear that the inventive procedures as defined and described with respect to the different aspects are highly flexible and can be very well adapted to specific use cases.

1st Aspect of Invention: Universal DirAC-Based Spatial Audio Coding/Rendering A Dirac-based spatial audio coder that can encode multichannel signals, Ambisonics formats and audio objects separately or simultaneously.

Benefits and Advantages Over State of the Art

- Universal DirAC-based spatial audio coding scheme for the most relevant immersive audio input formats
- Universal audio rendering of different input formats on different output formats

2nd Aspect of Invention: Combining Two or More DirAC Descriptions on a Decoder The second aspect of the invention is related to the combination and rendering two or more DirAC descriptions in the spectral domain.

Benefits and Advantages Over State of the Art

- Efficient and precise DirAC stream combination
- Allows the usage of DirAC universally represent any scene and to efficiently combine different streams in the parameter domain or the spectral domain
- Efficient and intuitive scene manipulation of individual DirAC scenes or the combined scene in the spectral domain and subsequent conversion into the time domain of the manipulated combined scene.

3rd Aspect of Invention: Conversion of Audio Objects into the DirAC Domain

The third aspect of the invention is related to the conversion of object metadata and optionally object waveform signals directly into the DirAC domain and in an embodiment the combination of several objects into an object representation.

Benefits and Advantages Over State of the Art

- Efficient and precise DirAC metadata estimation by simple metadata trans-coder of the audio objects metadata
- Allows DirAC to code complex audio scenes involving one or more audio objects
- Efficient method for coding audio objects through DirAC in a single parametric representation of the complete audio scene.

4th Aspect of Invention: Combination of Object Metadata and Regular DirAC Metadata The third aspect of the invention addresses the amendment of the DirAC metadata with the directions and, optimally, the distance or diffuseness of the individual objects composing the combined audio scene represented by the DirAC parameters. This extra information is easily coded, since it consist mainly of a single broadband direction per time unit and can be refreshed less frequently than the other DirAC parameters since objects can be assumed to be either static or moving at a slow pace.

Benefits and Advantages Over State of the Art

- Allows DirAC to code a complex audio scene involving one or more audio objects
- Efficient and precise DirAC metadata estimation by simple metadata trans-coder of the audio objects metadata.
- More efficient method for coding audio objects through DirAC by combining efficiently their metadata in DirAC domain
- Efficient method for coding audio objects and through DirAC by combining efficiently their audio representations in a single parametric representation of the audio scene.

5th Aspect of Invention: Manipulation of Objects MC Scenes and FOA/HOA C in DirAC Synthesis The fourth aspect is related to the decoder side and exploits the known positions of audio objects. The positions can be given by the user though an interactive interface and can also be included as extra side-information within the bitstream.

The aim is to be able to manipulate an output audio scene comprising a number of objects by individually changing the objects' attributes such as levels, equalization and/or spatial positions. It can also be envisioned to filter completely the object or restitute individual objects from the combined stream.

The manipulation of the output audio scene can be achieved by jointly processing the spatial parameters of the DirAC metadata, the objects' metadata, interactive user input if present and the audio signals carried in the transport channels.

Benefits and Advantages Over State of the Art

- Allows DirAC to output at the decoder side audio objects as presented at the input of the encoder.
- Allows DirAC reproduction to manipulate individual audio object by applying gains, rotation, or . . .
- Capability may use minimal additional computational effort since it only involves a position-dependent weighting operation prior to the rendering & synthesis filterbank at the end of the DirAC synthesis (additional object outputs will just involve one additional synthesis filterbank per object output).

REFERENCES THAT ARE ALL INCORPORATED IT THEIR ENTIRETY BY REFERENCE

[1] V. Pulkki, M-V Laitinen, J Vilkamo, J Ahonen, T Lokki and T Pihlajamäki, "Directional audio coding—perception-based reproduction of spatial sound", International Workshop on the Principles and Application on Spatial Hearing, November 2009, Zao; Miyagi, Japan.

[2] Ville Pulkki. "Virtual source positioning using vector base amplitude panning". J. Audio Eng. Soc., 45(6): 456{466, June 1997.

[3] M. V. Laitinen and V. Pulkki, "Converting 5.1 audio recordings to B-format for directional audio coding reproduction," 2011 IEEE International Conference on Acoustics, Speech and Signal Processing (ICASSP), Prague, 2011, pp. 61-64.

[4] G. Del Galdo, F. Kuech, M. Kallinger and R. Schultz-Amling, "Efficient merging of multiple audio streams for spatial sound reproduction in Directional Audio Coding," 2009 IEEE International Conference on Acoustics, Speech and Signal Processing, Taipei, 2009, pp. 265-268.

[5] Jürgen HERRE, CORNELIA FALCH, DIRK MAHNE, GIOVANNI DEL GALDO, MARKUS KALLINGER, AND OLIVER THIERGART, "Interactive Teleconferencing Combining Spatial Audio Object Coding and DirAC Technology", J. Audio Eng. Soc., Vol. 59, No. 12, 2011 December.

[6] R. Schultz-Amling, F. Kuech, M. Kallinger, G. Del Galdo, J. Ahonen, V. Pulkki, "Planar Microphone Array Processing for the Analysis and Reproduction of Spatial Audio using Directional Audio Coding," Audio Engineering Society Convention 124, Amsterdam, The Netherlands, 2008.

[7] Daniel P. Jarrett and Oliver Thiergart and Emanuel A. P. Habets and Patrick A. Naylor, "Coherence-Based Diffuseness Estimation in the Spherical Harmonic Domain", IEEE 27th Convention of Electrical and Electronics Engineers in Israel (IEEEI), 2012.

[8] U.S. Pat. No. 9,015,051.

The present invention provides, in further embodiments, and particularly with respect to the first aspect and also with respect to the other aspects different alternatives. These alternatives are the following:

Firstly, combining different formats in the B format domain and either doing the DirAC analysis in the encoder or transmitting the combined channels to a decoder and doing the DirAC analysis and synthesis there.

Secondly, combining different formats in the pressure/velocity domain and doing the DirAC analysis in the encoder. Alternatively, the pressure/velocity data are transmitted to the decoder and the DirAC analysis is done in the decoder and the synthesis is also done in the decoder.

Thirdly, combining different formats in the metadata domain and transmitting a single DirAC stream or transmitting several DirAC streams to a decoder before combining them and doing the combination in the decoder.

Furthermore, embodiments or aspects of the present invention are related to the following aspects:

Firstly, combining of different audio formats in accordance with the above three alternatives.

Secondly, a reception, combination and rendering of two DirAC descriptions already in the same format is performed.

Thirdly, a specific object to DirAC converter with a "direct conversion" of object data to DirAC data is implemented.

Fourthly, object metadata in addition to normal DirAC metadata and a combination of both metadata; both data are existing in the bitstream side-by-side, but audio objects are also described by DirAC metadata-style.

Fifthly, objects and the DirAC stream are separately transmitted to a decoder and objects are selectively manipulated within the decoder before converting the output audio (loudspeaker) signals into the time-domain.

It is to be mentioned here that all alternatives or aspects as discussed before and all aspects as defined by independent claims in the following claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

An inventively encoded audio signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for generating a description of an enhanced audio scene, comprising:

an input interface for receiving a first description of a first scene in a first format and a second description of a second scene in a second format, wherein the second format is different from the first format;

a format converter for converting the first description into a common format and for converting the second description into the common format, when the second format is different from the common format; and a format combiner for combining the first description in the common format and the second description in the common format to acquire a description of a combined audio scene comprising combined audio scene metadata and a combined audio scene transport signal;

a metadata generator for generating combined metadata, the combined metadata comprising the combined audio scene metadata and object metadata of a separate object description for a specific audio object, wherein the separate object description for the specific audio object comprises, in the object metadata of the separate object description for the specific audio object, a single direction throughout all frequency bands of the specific audio object, wherein the specific audio object is either static or moving slower than a velocity threshold, and wherein the separate object description comprises an object waveform signal, a transport encoder for encoding the transport signal and the object waveform signal to obtain an encoded transport signal; and an output interface for outputting the description of the enhanced audio scene, wherein the enhanced audio scene comprises the encoded transport signal and the combined metadata.

2. The apparatus of claim 1, wherein the first format is selected from a group of formats comprising a first order Ambisonics format, a high order Ambisonics format, a DirAC format, an audio object format and a multi-channel format, and wherein the second format is selected from a group of formats comprising a first order Ambisonics format, a high order Ambisonics format, the common format, a DirAC format, an audio object format, and a multi-channel format.

3. The apparatus of claim 1, wherein the format converter is configured to convert the first description into a first B-format signal representation and to convert the second description into a second B-format signal representation, and wherein the format combiner is configured to combine the first B-format signal representation and the second B-format signal representation by individually combining the individual components of the first B-format signal representation and the second B-format signal representation.

4. The apparatus of claim 1, wherein the format converter is configured to convert the first description into a first pressure/velocity signal representation and to convert the second description into a second pressure/velocity signal representation, and wherein the format combiner is configured to combine the first pressure/velocity signal representation and the second pressure/velocity signal representation by individually combining the individual components of the pressure/velocity signal representations to acquire a combined pressure/velocity signal representation.

5. The apparatus of claim 1, wherein the format converter is configured to convert the first description into a first DirAC parameter representation and to convert the second description into a second DirAC parameter representation, when the second description is different from the DirAC parameter representation, and wherein the format combiner is configured to combine the first DirAC parameter representation and the second DirAC parameter representation by individually combining the individual components of the first DirAC parameter representation and the second DirAC parameter representations to acquire a combined DirAC parameter representation for the combined audio scene.

6. The apparatus of claim 5, wherein the format combiner is configured to generate, as the combined audio scene metadata,—direction of arrival values for time-frequency tiles or direction of arrival values and diffuseness values for the time-frequency tiles representing the combined audio scene.

7. The apparatus of claim 1, further comprising a DirAC analyzer for analyzing the combined audio scene to derive DirAC parameters for the combined audio scene as the combined audio scene metadata, wherein the DirAC parameters comprise direction of arrival values for time-frequency tiles or direction of arrival values and diffuseness values for the time-frequency tiles representing the combined audio scene.

8. The apparatus of claim 1, further comprising:

a metadata encoder for encoding DirAC metadata as the combined audio scene metadata to acquire encoded DirAC metadata, or for encoding DirAC metadata derived from the first scene to acquire first encoded DirAC metadata and for encoding DirAC metadata derived from the second scene to acquire second encoded DirAC metadata, wherein the first encoded DirAC metadata and the second encoded DirAC metadata represent the combined audio scene metadata.

9. The apparatus of claim 1, wherein the combined audio scene metadata comprise encoded DirAC metadata and wherein the encoded transport signal comprises one or more encoded transport channels.

10. The apparatus of claim 1, wherein the metadata for the separate object description for the specific audio object comprises, in addition to the single direction, at least one of a distance, a diffuseness, and any other object attribute, and wherein the combined metadata comprises, as the object metadata for the separate object description for the specific audio object, the single direction, and at least one of the distance, the diffuseness, and the any other object attribute.

11. A method for generating a description of an enhanced audio scene, comprising:

receiving a first description of a first scene in a first format and receiving a second description of a second scene in a second format, wherein the second format is different from the first format;

converting the first description into a common format and converting the second description into the common format, when the second format is different from the common format; and combining the first description in the common format and the second description in the common format to acquire a description of a combined audio scene comprising combined audio scene metadata and a combined audio scene transport signal;

generating combined metadata, the combined metadata comprising the combined audio scene metadata and object metadata of a separate object description for a specific audio object, wherein the separate object description for the specific audio object comprises, in the object metadata of the separate object description for the specific audio object, a single direction throughout all frequency bands of the specific audio object, wherein the specific audio object is either static or moving slower than a velocity threshold, and wherein the separate object description comprises an object waveform signal, encoding the transport signal and the object waveform signal to obtain an encoded transport signal; and outputting the description of the enhanced audio scene, wherein the enhanced audio scene comprises the encoded transport signal and the combined metadata.

12. A non-transitory digital storage medium having a computer program stored thereon to perform, when said computer program is run by a computer, the method for generating a description of an enhanced audio scene comprising:

receiving a first description of a first scene in a first format and receiving a second description of a second scene in a second format, wherein the second format is different from the first format;

converting the first description into a common format and converting the second description into the common format, when the second format is different from the common format; and combining the first description in the common format and the second description in the common format to acquire a description of a combined audio scene comprising combined audio scene metadata and a combined audio scene transport signal;

generating combined metadata, the combined metadata comprising the combined audio scene metadata and object metadata of a separate object description for a specific audio object, wherein the separate object description for the specific audio object comprises, in the object metadata of the separate object description for the specific audio object, a single direction throughout all frequency bands of the specific audio object, wherein the specific audio object is either static or moving slower than a velocity threshold, and wherein the separate object description comprises an object waveform signal, encoding the transport signal and the object waveform signal to obtain an encoded transport signal; and outputting the description of the enhanced audio scene, wherein the enhanced audio scene comprises the encoded transport signal and the combined metadata.

13. The apparatus of claim 1, wherein the combined audio scene comprises, as the combined audio scene metadata, direction of arrival data and diffuseness data for each frequency band for a frame, and wherein the separate object description for the specific audio object comprises, as the object metadata, the single direction as direction of arrival data for all frequency bands of the frame, and wherein the combined metadata comprises the direction of arrival data and the diffuseness data for each frequency band for the frame, and the single direction for all frequency bands of the frame.

14. The apparatus of claim 13, wherein the separate object description for the specific audio object comprises, as the object metadata, a diffuseness of zero or no diffuseness for all the frequency bands of the frame, and wherein the combined metadata comprises the diffuseness of zero or no diffuseness.

15. The apparatus of claim 13, wherein the object metadata of the separate object description for the specific audio object is updated less frequently than the first audio scene and the second audio scene.

16. The apparatus of claim 13, wherein the combined audio scene comprises, as the combined audio scene metadata, the direction of arrival data and the diffuseness data for each frequency band and for each frame, and wherein the separate object description for the specific audio object comprises, as the object metadata, the single direction for all the frequency bands of every n-th frame only, wherein n is greater than or equal to two, and wherein the combined metadata comprise the direction of arrival data and the diffuseness data for each frequency band and for each frame and the single direction for all the frequency bands of every n-th frame only, wherein n is greater than or equal to two.

17. The apparatus of claim 1, further comprising a manipulator for selectively applying a spatial filtering to the specific audio object without affecting the combined audio scene by the spatial filtering.

* * * * *